Oct. 28, 1941.   R. S. DRUMMOND   2,260,935
SURFACE SHAVING MACHINE
Filed March 4, 1940   16 Sheets-Sheet 1

INVENTOR
ROBERT S. DRUMMOND
BY Whittemore, Hulbert
& Belknap ATTORNEYS

Oct. 28, 1941.  R. S. DRUMMOND  2,260,935
SURFACE SHAVING MACHINE
Filed March 4, 1940     16 Sheets-Sheet 2

INVENTOR
ROBERT S. DRUMMOND
BY Whittemore, Hulbert
& Belknap ATTORNEYS

Oct. 28, 1941.   R. S. DRUMMOND   2,260,935
SURFACE SHAVING MACHINE
Filed March 4, 1940   16 Sheets-Sheet 3

INVENTOR
ROBERT S. DRUMMOND
BY Whittemore, Hulbert
& Belknap ATTORNEYS

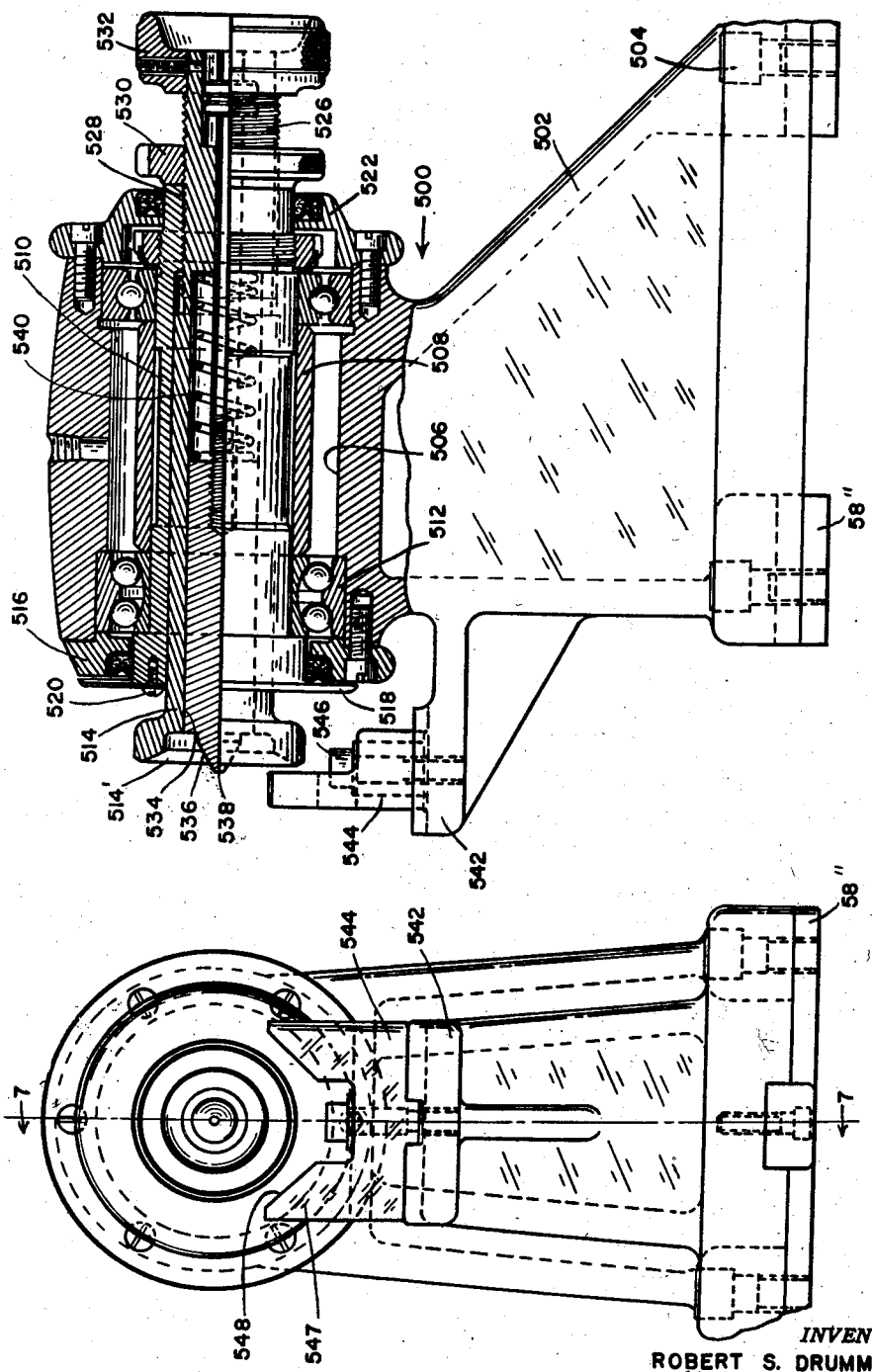

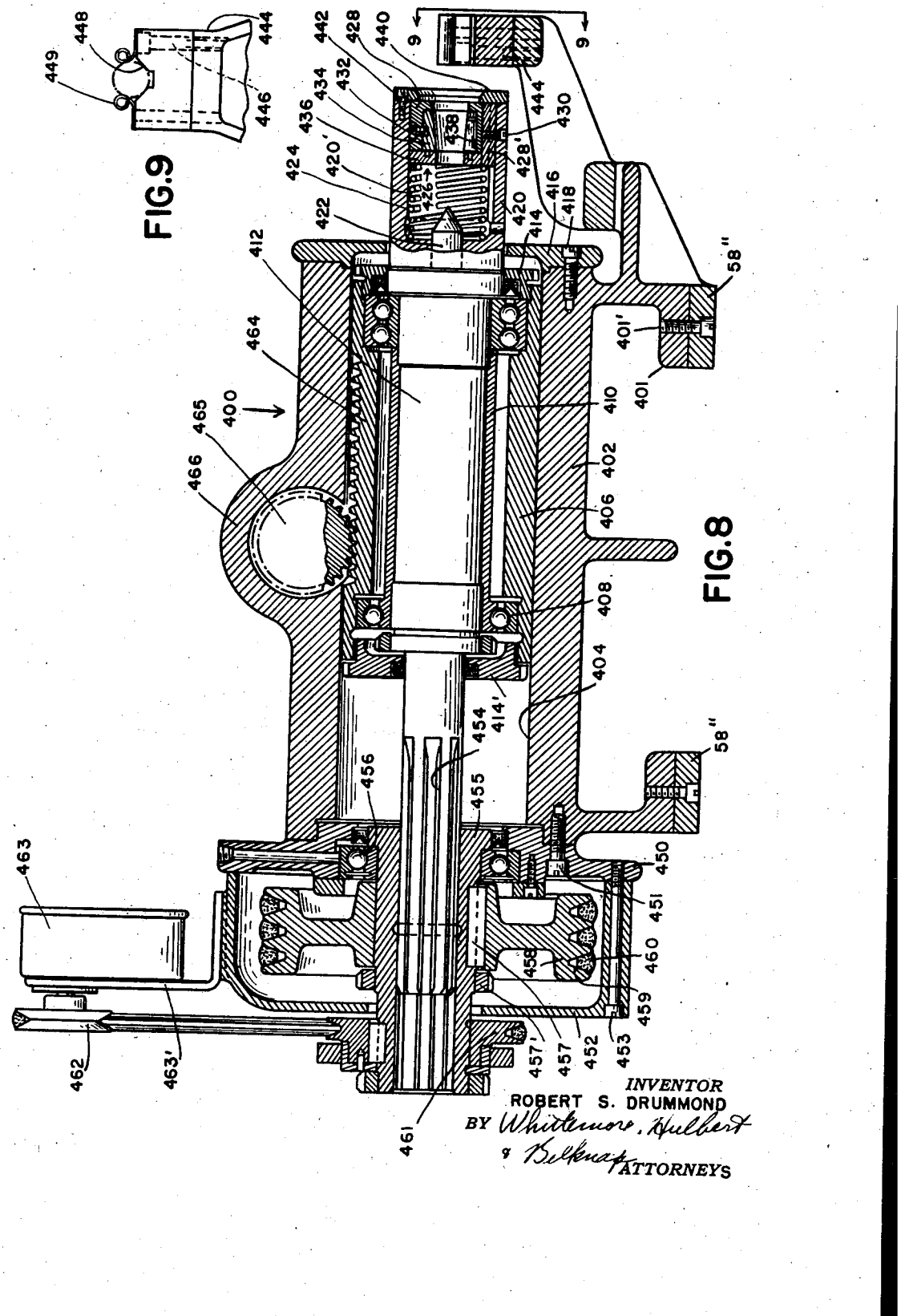

Oct. 28, 1941.    R. S. DRUMMOND    2,260,935
SURFACE SHAVING MACHINE
Filed March 4, 1940    16 Sheets-Sheet 6
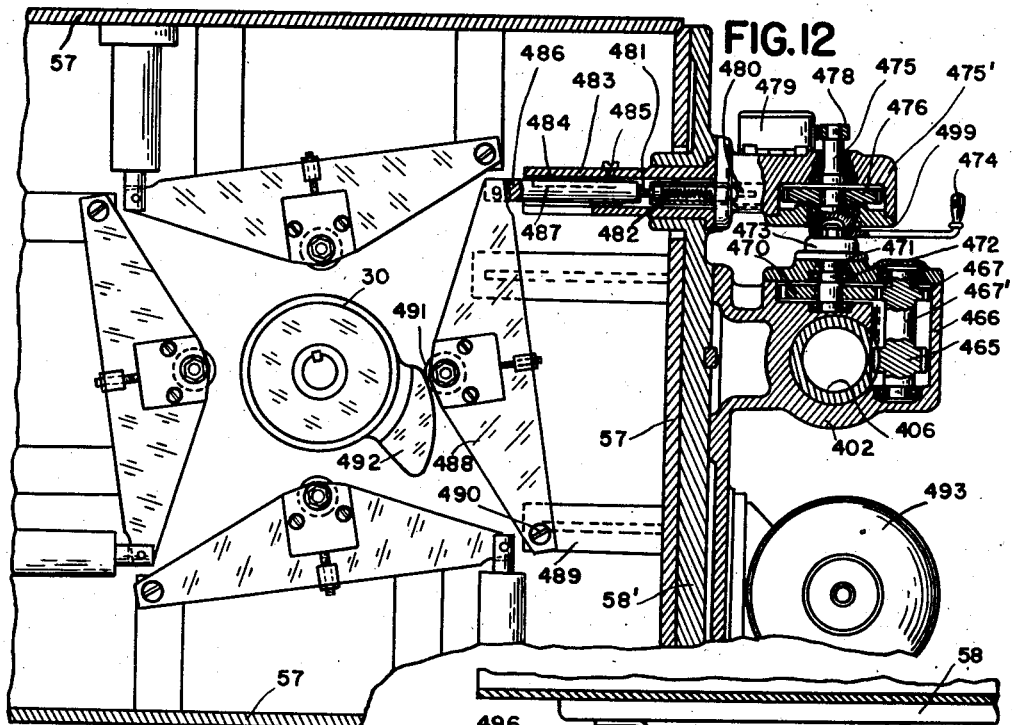
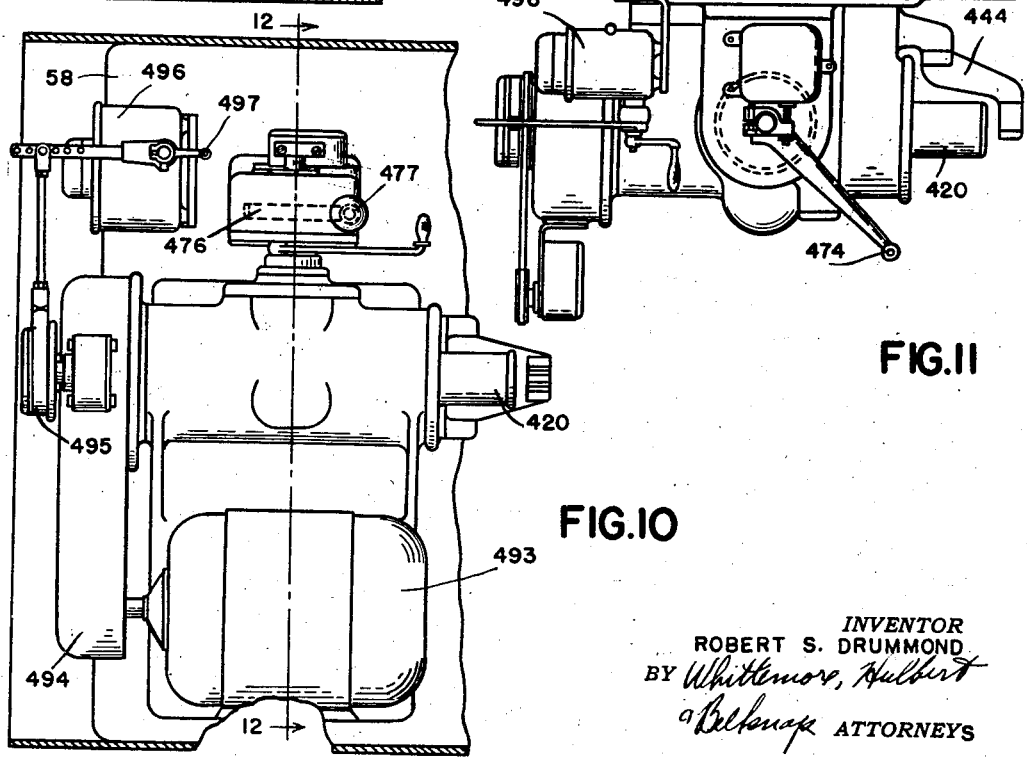
INVENTOR
ROBERT S. DRUMMOND
BY Whittemore, Hulbert
a Belknap ATTORNEYS Oct. 28, 1941.  R. S. DRUMMOND  2,260,935
SURFACE SHAVING MACHINE
Filed March 4, 1940    16 Sheets-Sheet 7

INVENTOR
ROBERT S. DRUMMOND
BY Whittemore, Hulbert
& Belknap ATTORNEYS

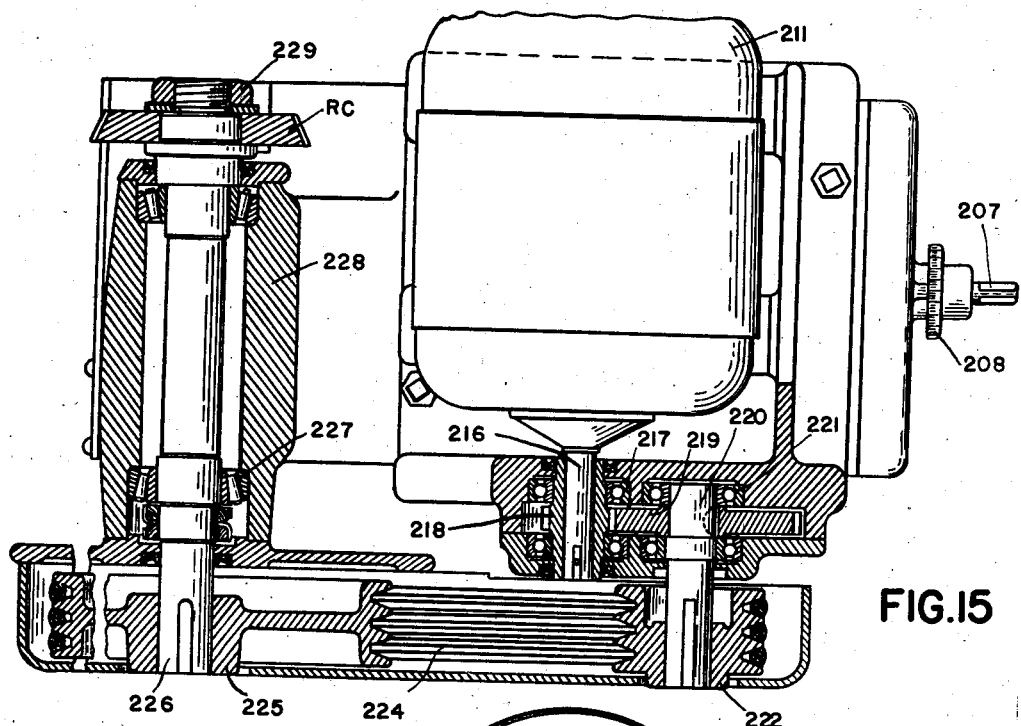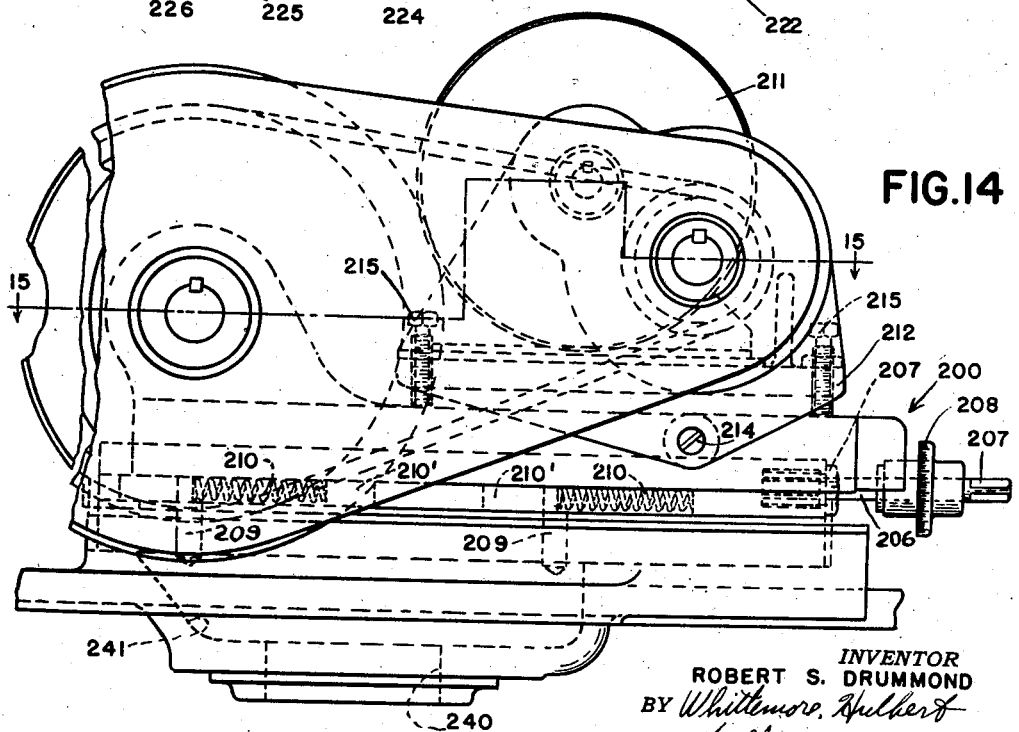

Oct. 28, 1941.　　　R. S. DRUMMOND　　　2,260,935
SURFACE SHAVING MACHINE
Filed March 4, 1940　　　16 Sheets-Sheet 9

INVENTOR
ROBERT S. DRUMMOND
BY Whittemore, Hulbert
& Belknap ATTORNEYS

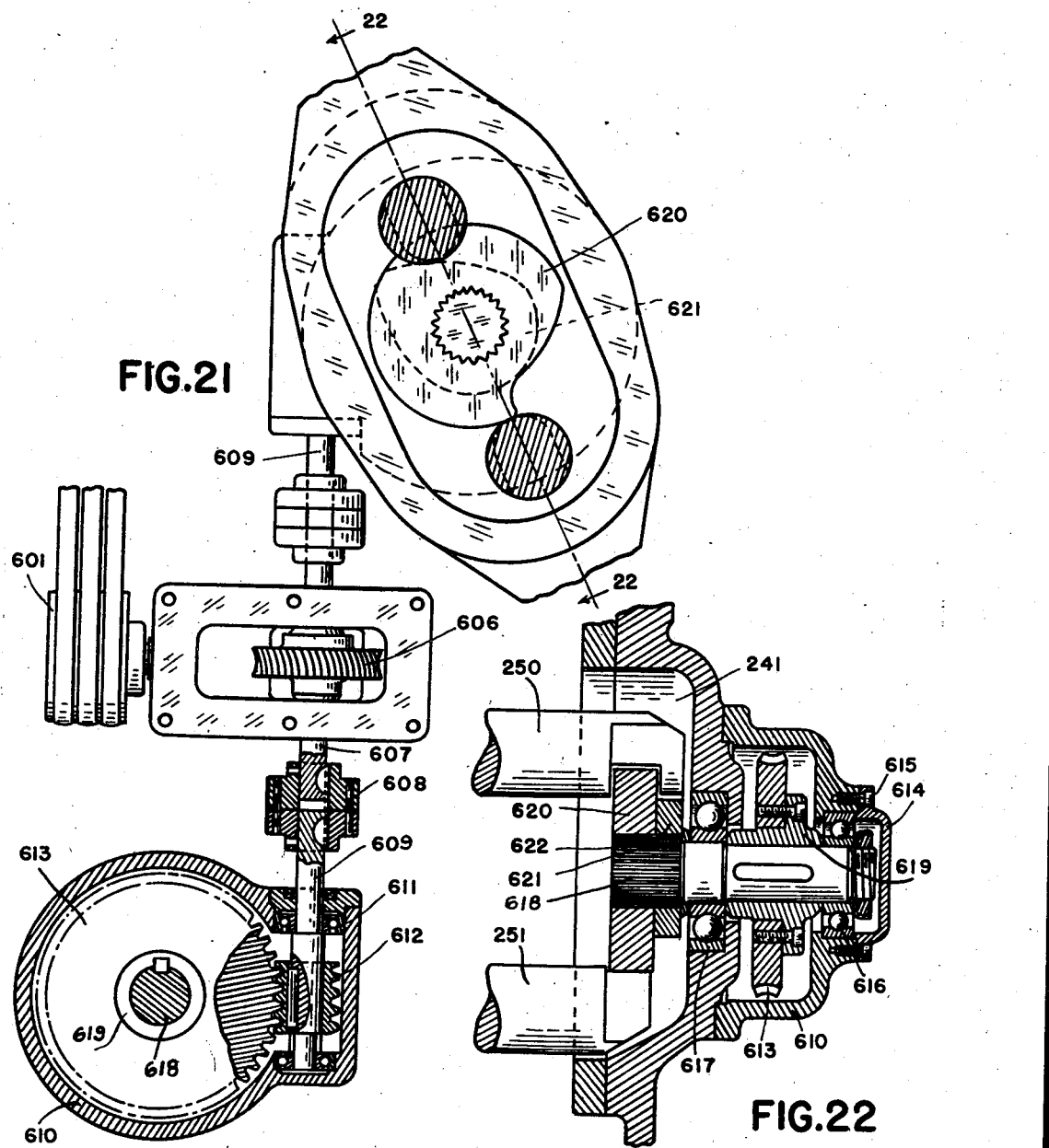

Oct. 28, 1941.  R. S. DRUMMOND  2,260,935
SURFACE SHAVING MACHINE
Filed March 4, 1940   16 Sheets-Sheet 11
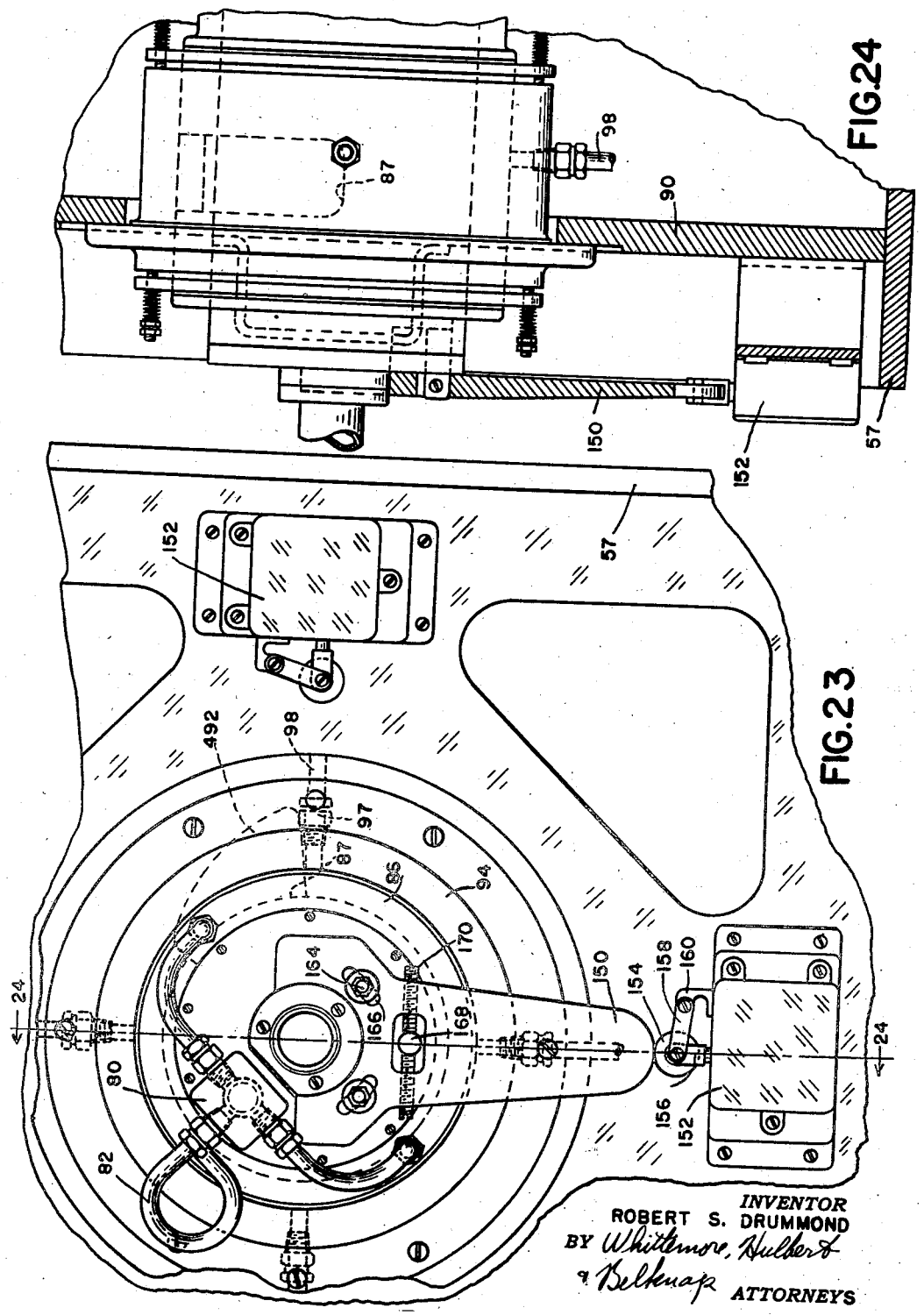
INVENTOR
ROBERT S. DRUMMOND
BY Whittemore, Hulbert
 & Belknap ATTORNEYS

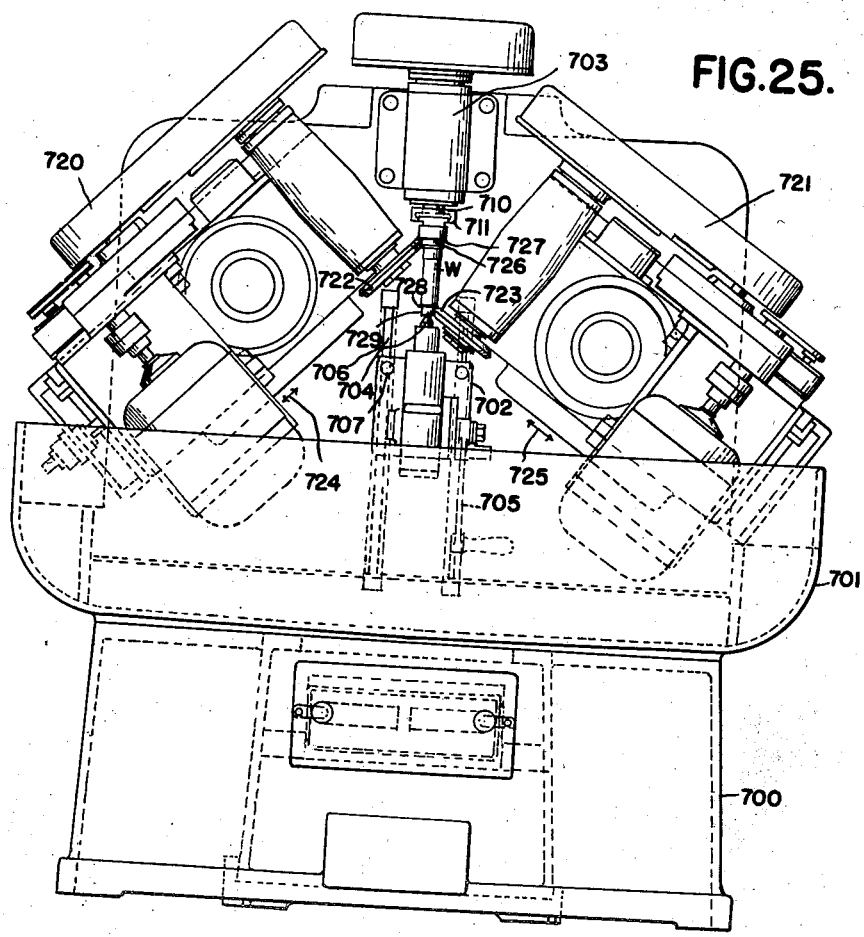

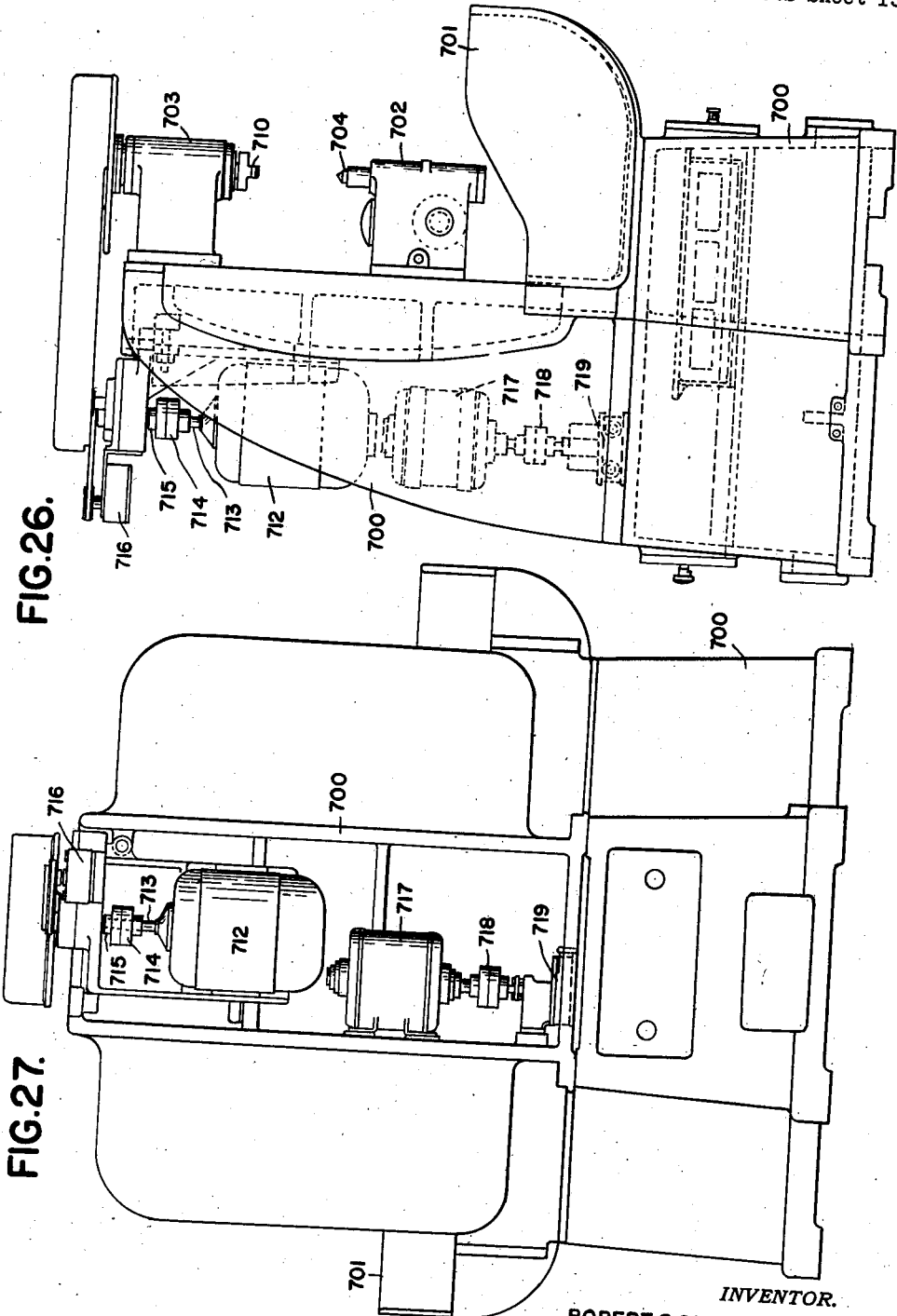

Oct. 28, 1941.    R. S. DRUMMOND    2,260,935
SURFACE SHAVING MACHINE
Filed March 4, 1940    16 Sheets-Sheet 14

INVENTOR.
ROBERT S. DRUMMOND
BY Whittemore, Hulbert
& Belknap
ATTORNEYS

Oct. 28, 1941.          R. S. DRUMMOND          2,260,935
SURFACE SHAVING MACHINE
Filed March 4, 1940          16 Sheets-Sheet 15

INVENTOR.
ROBERT S. DRUMMOND
BY Whittemore, Hulbert
& Belknap ATTORNEYS

Oct. 28, 1941.                R. S. DRUMMOND                2,260,935
                           SURFACE SHAVING MACHINE
                            Filed March 4, 1940            16 Sheets—Sheet 16
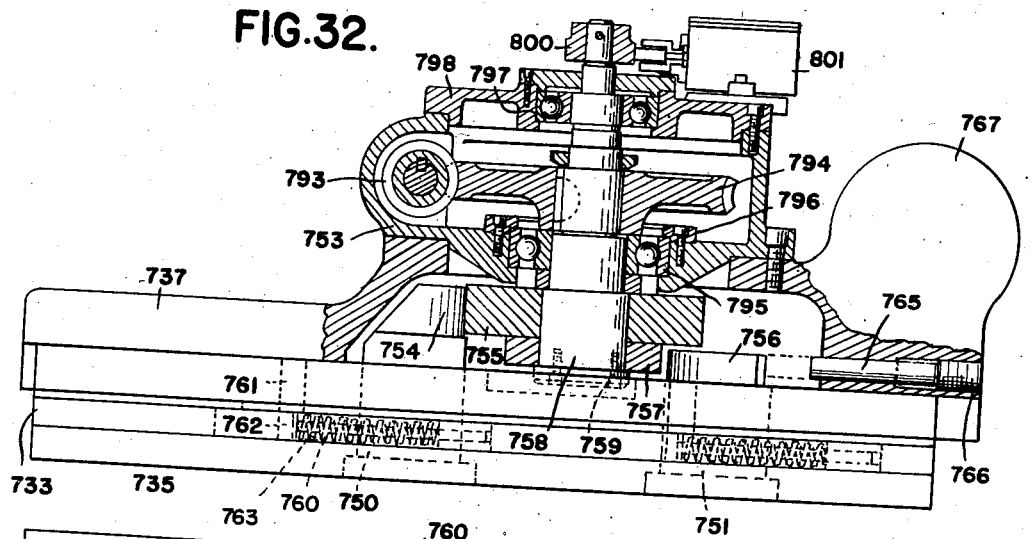
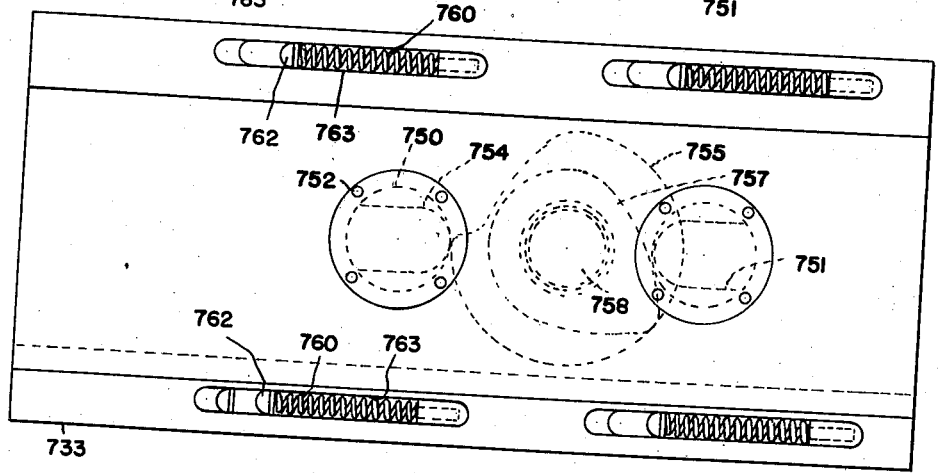
INVENTOR.
ROBERT S. DRUMMOND
BY Whittemore, Hulbert
& Belknap
ATTORNEYS Patented Oct. 28, 1941

2,260,935

UNITED STATES PATENT OFFICE 2,260,935

SURFACE SHAVING MACHINE

Robert S. Drummond, Detroit, Mich., assignor to National Broach and Machine Company, Detroit, Mich., a corporation of Michigan Application March 4, 1940, Serial No. 322,210

22 Claims. (Cl. 90—11)

The present invention relates to a surface shaving machine for finishing work pieces having one or more surfaces of revolution.

It is an object of the present invention to provide a machine having a relatively movable work spindle and tool spindle in combination with means for relatively feeding the tool spindle in plunge cutting relation while rotating both of said spindles and for terminating a cycle of operation of the machine.

It is a further object of the present invention to provide a surface finishing machine having a work spindle, a plurality of relatively movable tool spindles, separate motor means for both rotating and translating said tool spindles, a motor for rotating the work spindle, and control means associated with each tool spindle for arresting operation of each tool spindle, said control means being related so as to terminate rotation of the work spindle upon termination of operation of all of said tool spindles.

It is a further object of the present invention to provide a surface shaving machine having a plurality of tool carriages, each of the tool carriages having mounted thereon a rotatable tool spindle and a motor effective both to rotate the tool spindle and to translate the tool carriage.

Other objects of the invention will be apparent as the description proceeds, and when taken in conjunction with the accompanying drawings wherein:

Figure 6 is a front elevation of the tailstock assembly;

Figure 7 is a section on the line 7—7 of Figure 6;

Figure 8 is a longitudinal section of the headstock assembly;

Figure 9 is a fragmentary end elevation of the headstock assembly;

Figure 10 is a fragmentary front elevation of the machine showing the headstock assembly;

Figure 11 is a fragmentary side elevation of the headstock assembly;

Figure 12 is a section on the line 12—12 of Figure 10;

Figure 14 is a side elevation partly in section of the right-hand cutter assembly;

Figure 15 is a section on the line 15—15 of Figure 14;

Figure 21 is an elevation partly in section of the connections between the drive shaft and the feed cam structure;

Figure 22 is a section on the line 22—22 of Figure 21;

Figure 23 is a plan of the top of the machine;

Figure 24 is a section on the line 24—24 of Figure 23;

Figure 25 is a front elevation of a single station machine;

Figure 26 is a side elevation of the machine shown in Figure 25;

Figure 27 is a rear elevation of the machine shown in Figure 25;

Figure 31 is a fragmentary section of the gear case taken through the transmission gear centers;

Figure 32 is a fragmentary elevation, partly in section, of the tool slide and associated mechanism; and Figure 33 is a bottom plan view of the structure shown in Figure 32.

Reference is first had to Figures 1 to 24 relating to a multiple station surface finishing machine. Figures 25 to 33 illustrate a single station surface machine, and will subsequently be described.

The present application is a continuation in part of my copending application, Serial No.

177,147, filed November 29, 1937, entitled "Multiple station surface finishing machine."

Figure 1:
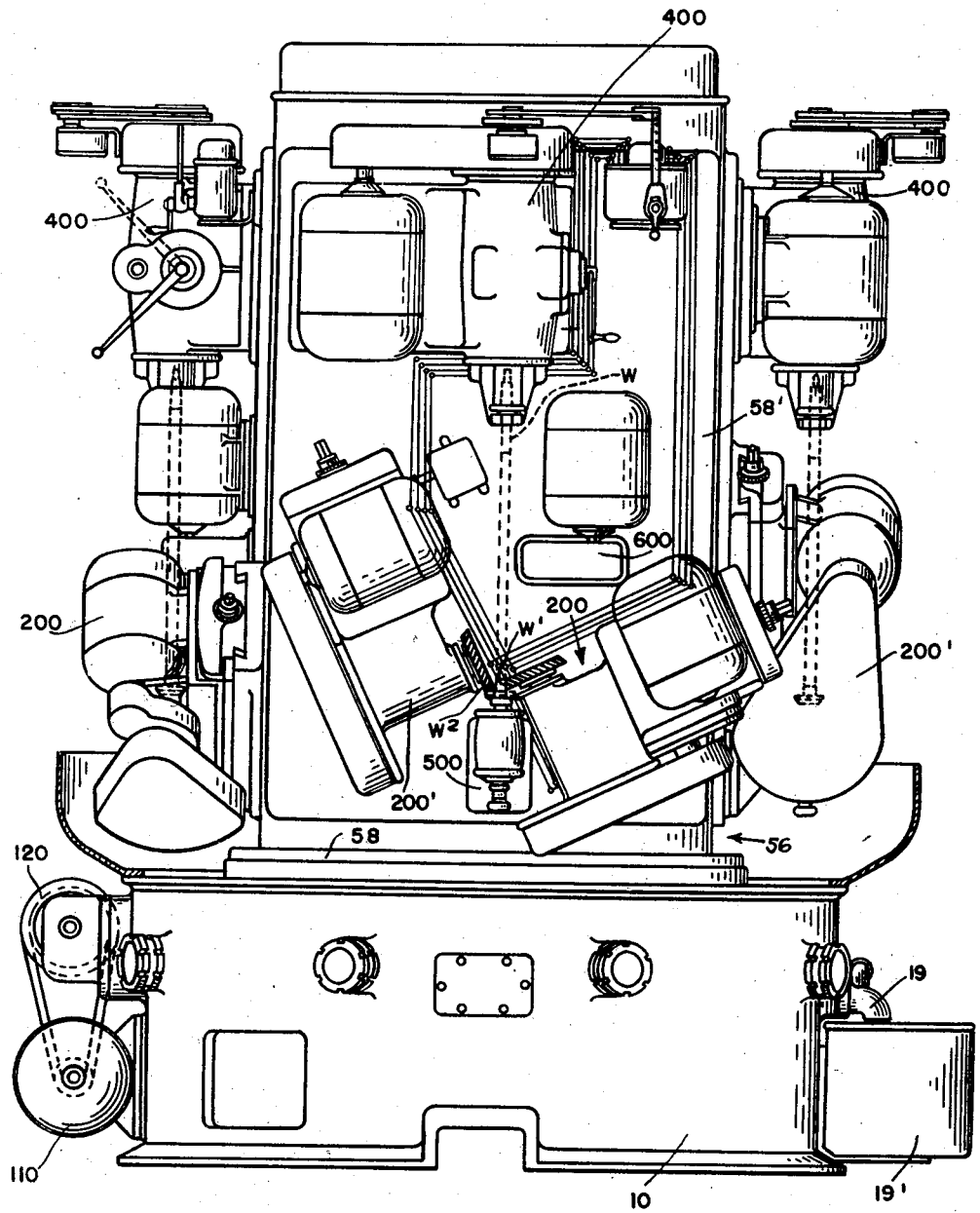
Figure 1 is a front elevation of the complete machine.

In the multiple station type of machine a part to be finished, such, for example, as W in Figure 1 is mounted for rotation between centers. Independent means are provided for rotating this work place shown at 400 in Figure 1. In the example shown, the part W is an axle shaft having adjacent angularly related surfaces W' which is cylindrical and W² which is radial and right angularly related to surfaces W'. Tool carriages 200 and 200' are provided adjacent the surfaces to be finished. These carriages are mounted for translation toward and from the work piece and each carriage has a mounting thereon for a rotary finishing tool. Also carried by each carriage is a motor for rotating its respective tool. As disclosed in my copending application above mentioned and in the present machine the carriages are mounted for translation along a path angularly related to the axis of the work. In the example illustrated, each tool has a component of motion as its carriage travels along its path which is perpendicular to the surface to be finished and a second component of motion which is parallel to the surface to be finished. Independent mechanism is provided indicated at 600 in Figure 1 for simultaneously feeding the tool carriages into the work to a predetermined depth and return.

General arrangement

The present machine contemplates the provision of a plurality of surface finishing mechanisms substantially similar to that disclosed in my copending application. These surface finishing mechanisms are mounted on a single carriage which in turn is constantly rotated by a worm driven by the motor 110 carried by the base 10. As the carriage 56 is rotated a stationary cam later to be described is supported from the base 10 and operates mechanism which raises the headstock 400 and releases the work piece W. The work piece W is retained in position by a suitable spring clip 449. The operator standing in front of the machine at the position where the head 400 is operated to release the work piece removes the finished work and replaces it with a piece to be finished. This occurs while the carriage is rotating past this loading position. Immediately after passing the loading position the head 400 is lowered into operative engagement with the work piece and a friction clutch engages the work piece and rotates it independently of the rotation of the tool elements. A second stationary cam carried from the stationary base 10 is adapted to operate switches which start the rotation of the four motors carried by each individual panel. These motors rotate the work and each tool and, in addition, through a suitable mechanism later to be described, feed the finishing tools in plunge cutting relation to the work and return. Upon completion of the working stroke a suitable limit switch is operated which stops rotation of all motors on the panel under consideration.

Figure 3:
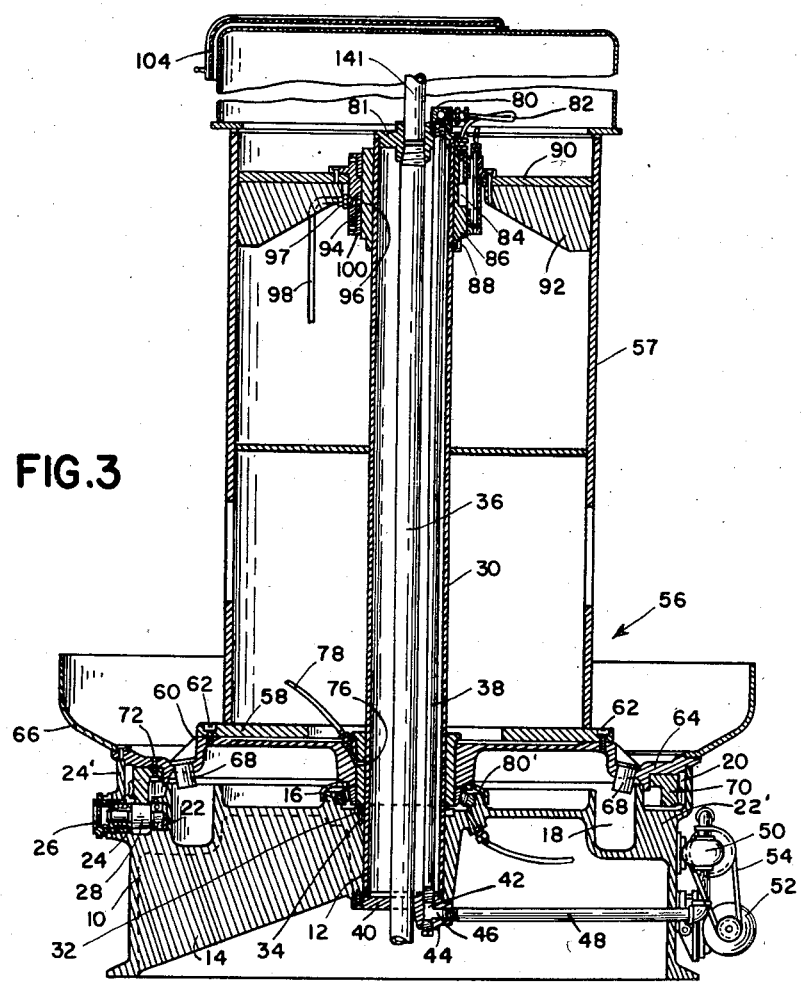
Figure 3 is a vertical section through the machine with panels and associated mechanism carried thereby omitted for clearness.
Figure 2:
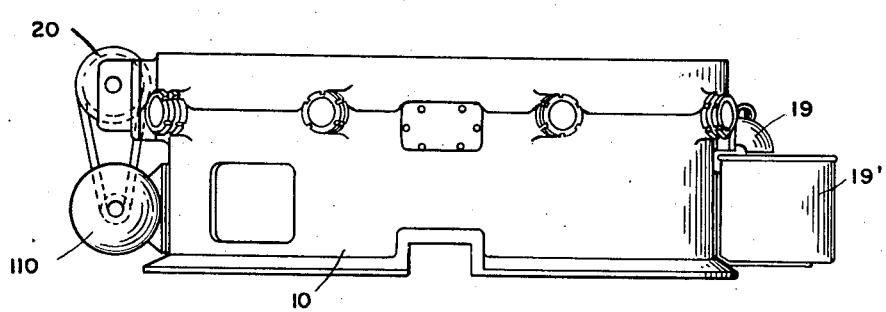
Figure 2 is a front elevation of the base for the machine.

The motor 110 is constantly rotated and as a result, through a worm later to be described, constantly rotates the table which carries the panels upon which are mounted the independent finishing mechanisms. A second motor 52 carried by the base operates a pump 50 which supplies coolant through a conduit which includes pipe 48, and intersecting drilled passages 46, 42 in a coupling member 44, pipe 38, manifold 80 and a plurality of flexible conduits 82 into an interrupted annular space 84, as best seen in Figure 3.

Base, table and column assembly

The multiple station machine is adapted to be supported on base 10 which takes the form of a relatively low heavy casting, having a central collared aperture 12 and supporting webs 14. On the top of the base 10 an upstanding annular shoulder 16 forms a space in which is mounted guiding roller bearings 80'. Outwardly spaced therefrom is an upwardly opening channel 18 which is adapted to receive coolant as it drains back into the base from a drain pan 66 secured to the base 10 and connected to the channel 18 at spaced points by pipes 68. The outer edge of the channel 18 is formed by a wall portion 22' in which is formed at circumferentially spaced points outwardly opening recesses 22. The base portion, outwardly from the recesses 22, has an upwardly extending flange 24' which is provided with apertures 24 registering with the recesses 22. Heavy roller bearings 28 are mounted between the recesses and apertures, a cover 26 being provided to close and seal the recess. Received within the central aperture 12 in the base is a rigid tubular member 30. The member 30 is rigidly secured to the base by means of a ring 32 which is welded to the member 30 and is secured to the base 10 by a suitable securing means such as bolts 34.

The rotatable table generally indicated at 56, comprises a heavy column portion 57 which is square in the embodiment illustrated. The column 57 rests on plate 58 which in turn is secured to the table member 60 by suitable securing means such as bolts 62. At the upper end of column 57 an upper closure plate 90 is secured thereto and braced by suitable web pieces 92. Carried by the top closure plate 90 is a coolant manifold 94 to which at 90° intervals are connected nipples 97 and conduits 98 for conducting coolant to the cutter heads. Packing glands 100 are provided to prevent leakage of oil. Rigidly secured to the tubular member 30 by securing means such as bolts 88 is a cylindrical coolant valve 86 which is provided about its outer periphery with a channel 84. The channel 84 extends for an arc of substantially 270° thereabout and, as will be obvious, is adapted to afford communication to three of the coolant conduits 98 simultaneously. The other coolant conduit 98 to which the flow of oil is shut off is the one which at that moment is passing the loading station. The top of the tube 30 is closed by a closure plate 81 which is centrally apertured to receive pipes 36 and 141. The pipes are provided to house the wiring by means of which current is supplied to the various motors carried by the rotating table and column. The top of the pipe 141 is in the form of a slip ring post.

Figure 5:
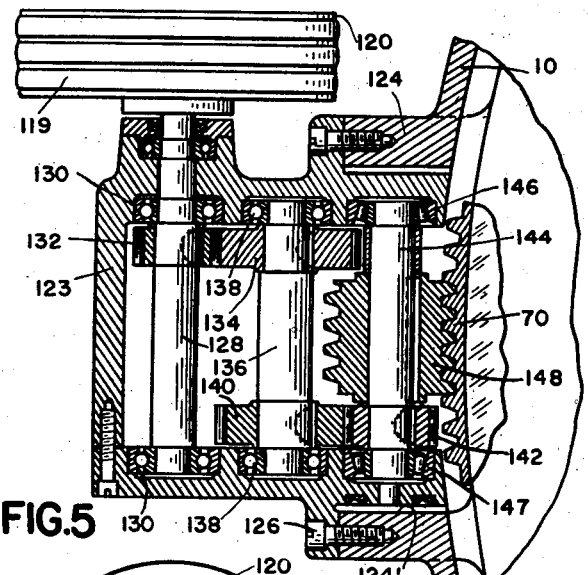
Figure 5 is a section on the line 5—5 of Figure 4.
Figure 4:
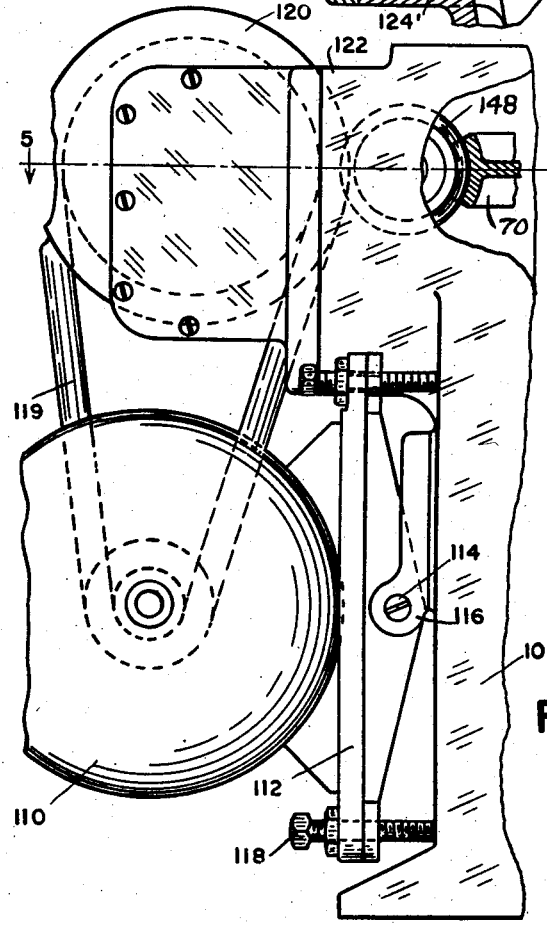
Figure 4 is a plan view of the main drive gear box.

The mechanism for rotating the table and associated column is best shown in Figures 4 and 5. As will be seen in these figures, a motor 110 is mounted on a bracket 112 which in turn is secured to the base 10 by means of a trunnion bearing 116, 114. Stud bolts 118 are provided on opposite sides of the trunnion bearing whereby the motor may be rocked about the trunnion bearing in order to adjust tension of its driving belt.

Referring again to Figure 3, the table 60 has bolted to the underside thereof as at 72 a circular rack 70. At a point opposite the rack 70 the base 10 has an aperture 124' surrounded by an outwardly extending annular projection 124. A housing 123 is bolted to flange 124 as by bolts 126 and is adapted to house gearing interconnecting the sheave 120 with the worm 148. The sheave 120 is keyed or otherwise suitably secured to shaft 128 which is journaled in the housing 123 and provided with suitable bearings 130. The shaft 128 carries pinion 132 which is adapted to mesh with the gear 134. The gear 134 is keyed to shaft 136. Suitable bearings 138 are provided in the housing for the shaft 136. A second gear 140 is secured to the opposite end of this shaft and is adapted to mesh with a gear 142 secured to shaft 144. Shaft 144 is journaled in bearings 146, 147 which extend within the space defined by the projecting flanges 124. The worm 148 is adapted to be in constant mesh with the rack 70. The motor 110 is connected to sheave 120 by flexible driving means such, for example, as the V-belt 119. As will be obvious, as long as the motor 110 is energized the table and column carrying the surface finishing mechanism will be continuously rotated.

A plate 58' is carried by each face of the square column 57. This plate is adapted to carry the headstock, tailstock, tool carriages and mechanism for feeding the tool carriages which will now be described in detail.

Tailstock assembly

The tailstock generally indicated at 500 and best shown in Figures 6 and 7, comprises a bracket 502 which is secured to the plate 58' (Figure 1) by bolts 504 and key means 58". The bracket 502 is provided with an enlarged bore 506 in which is housed the tailstock assembly. This assembly comprises spaced bearings 512 with a spacer 508 positioned therebetween. Internally of the spacer is a spindle sleeve 510 which is rotatably supported by means of the bearings aforesaid. Received within the spindle sleeve is the spindle 514. The spindle is provided adjacent its rear end with screw threads 528 which are adapted to cooperate with corresponding screw threads on the interior of the spindle sleeve. A lock nut 530 is mounted in screw threaded relation on the spindle and is adapted to lock the spindle in predetermined relation to the spindle sleeve. A knurled knob 532 is provided at the end of the spindle by means of which the spindle is adapted to be rotated and thereby adjusted relative to the spindle sleeve and consequently the bracket. A cap 516 is provided to lock the bearing assembly 512 in position at the forward end of the tailstock and a second plate 522 is adapted to close the rear end of the bore and to surround the spindle. The spindle 514 is provided at its forward end with an outwardly cupped portion 514' and centrally thereof with a longitudinal extending bore 534. A centering pin 538 is slidably received within the bore 534 and is urged outwardly by means of a spring 540. The outward end of the pin 536 is provided with a reduced pointed conical portion which is adapted to center the work piece. The bracket 502 is provided at its forward end with an extension 542 to which is secured as by bolts 546 a guide member 544. This guide member has two parallel extensions 547 provided with inclined surfaces 548. The purpose of this guide is to assist the operator in centering the work piece. As will be obvious, it is only necessary to move the work piece against the guiding surfaces 548 in which position it will be accurately centered over the centering pin 536 and may then be allowed to engage the tailstock spindle proper. It will be understood that the work piece is supported on the panel in vertical position and that the tailstock is adapted to support the bottom on the work piece.

A guard plate 518 is secured to the forward exposed end of the spindle sleeve 510 by suitable securing means such as bolts 520.

Headstock assembly

The headstock 400 is adapted to be mounted adjacent the top of the panel 58' directly above the tailstock 500. The headstock is mounted in a headstock housing 402 which is secured to the keys 58" by means of flanges 401 by bolts 401'. The headstock housing 402 has an enlarged central bore 404 which is adapted to receive the removable headstock in slidable relation. Mounted in the bore 404 is a bearing housing 406 in which bearings 408 are mounted and separated by a spacer 410. The bearings are retained in assembled position by retainers 414 and 414'. The spindle 412 is received within the bearing housing in rotatable relation thereto through the medium of the bearings above mentioned. The spindle is provided at its forward end with a projecting annular collar 420 defining a chamber 420' therein. Within the chamber extends the center 422. Also mounted within the recess 420' is an automatic clutch mechanism 426 which will now be described.

Adjacent the outer end of the chamber is secured a roller chuck housing 428 which is keyed to the collar 420 by a key 428' bolted or otherwise secured as at 430 to the collar. The outer end of the chuck housing 428 is provided with an inwardly extending annular flange and an end plate 436 is secured to the opposite end of the chuck housing. Between the end plate 436 and the inwardly extending annular collar are provided alternate tapered rollers 438 and roller spacers 434. This entire assembly is slidably mounted within the space 420' and is retained therein against a compression spring 424 by an apertured clutch plate 440 secured to the collar 420 as by bolts 442. The headstock housing is provided with a forwardly extending bracket 444 which extends to a position in front of the open end of the headstock proper. This bracket 444 is provided at its upper end with inclined guide surfaces 448 which are so related to the aperture in the headstock that a work piece engaging both of the inclined surfaces is accurately centered with respect to the aperture. Spiral leaf springs 449 are provided adjacent the inclined surfaces, as best seen in Figure 9. The relationship is such that when the automatic headstock is withdrawn, unchucking the work piece, the springs 449 will be sufficient to retain the work piece in position.

As before stated, it is contemplated that the headstock in my improved surface finishing machine shall be automatically operated and to this end I provide the outer portion of the bearing housing 406 with a series of rack teeth 464. Suitable mechanism later to be described is provided which is adapted at a certain phase in the cycle to operate gear 465 which is received within an enlarged portion 466 of the headstock housing. As will be obvious from an inspection of Figure 8, rotation of gear 465 in a clockwise direction will cause retraction of the bearing housing spindle 412 and the associated parts within the space 420'. It is contemplated that the headstock will be withdrawn a distance sufficient to entirely free the same from the work piece. As before stated, the headstock and tailstock are vertically arranged so that the work piece will at this time be supported at its bottom against the tailstock and at its upper end by the springs 449 pressing the same against the inclined surfaces 448.

In order to provide for rotation of the headstock in any position of axial adjustment the rear portion of the spindle 412 has a reduced splined portion 454. The splined portion 454 is slidably received within a correspondingly splined cylindrical driving member 455. The driving member 455 has keyed thereto as at 457 a sheave 458 which is peripherally grooved as at 459 to receive the belts 460. The driver 455 and the sheave are retained in position by means of a locking nut 457'. This assembly is housed within a space provided between a closure member 450 which is bolted or otherwise secured as at 451 to the upper open end of the headstock housing and a housing member 452 which is bolted or otherwise secured as at 453 to the closure plate 450. The driver is rotatably supported within the closure plate 450 by suitable bearing means 456. The sheave 458 is connected by the V-belts 460 to a suitable driving motor 493. (See Figure 10.)

On the rearward end of the driver 454 is secured a sheave 461 which is aligned with the sheave 462 carried by a bracket 463'. A friction relay 463 is carried by the bracket and operatively connected to the sheave 462. This relay functions in a well known manner to stop rotation of the headstock immediately upon deenergization of the motor. Such an arrangement is desirable because of inertia of the motor and associated parts.

*Automatic control for headstock spindle*

As stated above, suitable automatic mechanism is provided for retracting the headstock as the panel approaches the loading position. This mechanism is best shown in Figures 10 to 12. Figure 12 illustrates a cam 492 secured to the column 30. This cam is adjustably supported but in operation will remain stationary. As can be seen, as the column 57 rotates (in a clockwise direction in Figure 12) the cam 492 is adapted to engage a roller 491 carried intermediate a lever 488. This lever is pivoted at one end as at 490 to a post 489 and its other end is connected by a suitable loose connection to a plunger 486. The panel member 58' secured to the plate 57 has secured in an aperture therein an inwardly extending bushing support 483. A bushing 484 is provided within the bushing support and a guiding bolt 485 projects through both the bushing support and the bushing to engage in a groove 487 in the plunger 486. Secured to the outer side of the panel 58' in aligned position relative to the bushing support is a housing 475'. Within this housing in slidable relation is supported a rack 477 (see Figure 10). A projection on the rack extends into the bushing 484 to a point adjacent the plunger 486. This projection is bored and has a relatively strong compression spring 482 therein. A slidable button 481 is provided in the end of the projection against which the spring 482 bears. The relationship is such that in normal operation the plunger 486 engages the button and through the intermediacy of the spring actuates the rack 477. If for any reason any of the moving parts which are actuated through the rack 477 are arrested, the button and spring are adapted to be moved relative to the extension to prevent breaking of parts. The housing 475' is provided with a closure 499 which provides therein an enclosed space in which is secured a gear 476. The gear 476 is keyed to shaft 475 which is mounted in suitable bearings in the housing. On the outer end of the shaft is provided a cam 478 which is arranged to cooperate with a limit switch 479 to prevent actuation of the driving motors while the headstock is in retracted position.

The gear 476 is in operative engagement with the rack 477 and as the column 57 rotates so that cam 492 operates plunger 486, rotation will obviously be imparted to gear 476. Rotation of gear 476 is transferred through a double acting fixture lock 473 to a shaft 471 within the headstock housing. Suitable bearings 472 are provided for the shaft 471 and a gear 470 is carried thereby. A second gear 467 carried by a shaft 467' engages gear 470 and a third gear 465 is carried by the opposite end of shaft 467'. The gear 465, best seen in Figure 8, operatively engages with the rack teeth 464 on the bearing housing 406 in a manner to raise and lower the headstock assembly.

The double acting fixture lock referred to is of the type which permits movement to be transmitted therethrough when the applied force comes from one side of the lock but which prevents such movement when the moving force is on the other side of the lock. As used here, this lock permits the cam and associated rack and pinion mechanism to raise the headstock. After the roller 491 has passed the cam 492, the operating handle 474 of the fixture lock must be operated in order to permit the headstock to return to operative position. In addition the fixture lock serves the function of preventing the headstock from being raised or loosened by extraneous force such, for example, as vibration when such force is applied directly to the headstock assembly.

Mechanism for oiling the slides which support the carriages is provided and takes the form of a forced feed lubricator 496 which is adapted to be operated by means of an eccentric 495 operated from the motor 493 which also rotates the headstock. The handle 497 is provided in order that feed may be accelerated manually, if desired.

*Cutter head assembly*

Figure 13:
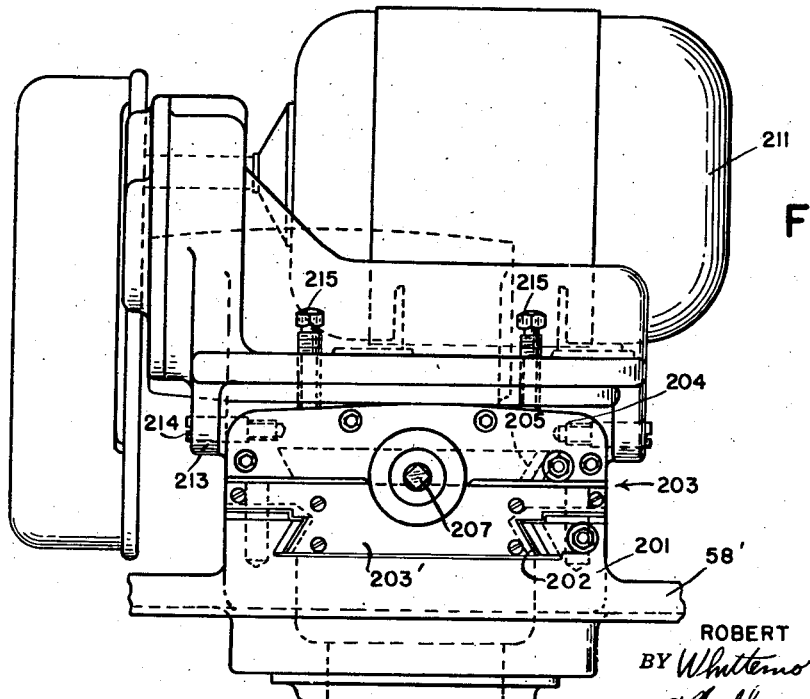
Figure 13 is an end elevation of the right-hand cutter assembly.

Two cutter heads are provided, one indicated at 200 in Figure 1 being referred to herein as the right hand cutter. This cutter is adapted to shave on the cylindrical surface of the axle. The cutter head assembly comprises a carriage 203 which is provided with a slide 203' mounted in ways 202 formed in a projection 201 on the plate 58'. These ways, as indicated in Figure 13, have hardened inserts to take the bearing. Suitable mechanism later to be described is provided which reciprocates the carriage 203. The slide 203' is provided with a second set of ways 205 on which is slidably mounted a base 204.

Means for providing for a relative adjustment between base 204 and slide 203' is provided and takes the form of a threaded member 206 carried by the base 204 and having threaded engagement in a portion of the slide 203'. The outer end of threaded member 206 is squared as at 207 for cooperation with a suitable detachable handle and a scale 208 is provided to indicate the adjustment.

Since this cutter head is adapted to reciprocate in an oblique direction it is desirable to counteract its weight by spring means and these are provided at 210. Suitable studs 209 are secured to the guide 201 and extend upwardly into the path of portions of the slide 203. Suitable recesses 210' are provided in the slide 203' to house the springs 210. As shown in Figure 14, two pairs of springs are provided and these springs are selected so that they effectively counterbalance the weight of the cutter head assembly.

A driving motor 211 is secured to the base 204 by means of a trunnion connection 213 comprising pivots 214. Pairs of stud bolts 215 on opposite sides of the trunnion axis are adapted to adjust the motor about this axis and at the same time to maintain the motor support rigid. This adjustment is for the purpose of tensioning the belt 224. As best seen in Figure 15, the motor shaft 216 is keyed to a motor pinion 218 which is supported in suitable bearings 217. Motor pinion 218 meshes with a gear 219 which is keyed to a shaft 220 mounted in suitable bearings 221. The shaft 220 has keyed to the outer end thereof a sheave 222 provided with suitable circumferential grooves to receive the V-belt 224. The cutter RC is secured to shaft 226 which is provided with suitable thrust bearings 227 and the cutter is locked to the shaft by a nut 229. The shaft 226 is keyed or otherwise secured to a sheave 225 which is provided with suitable peripheral grooves to receive the V-belt 224. Rotation of the motor 211 drives the cutter through the bearing and belt just described.

Figure 16:
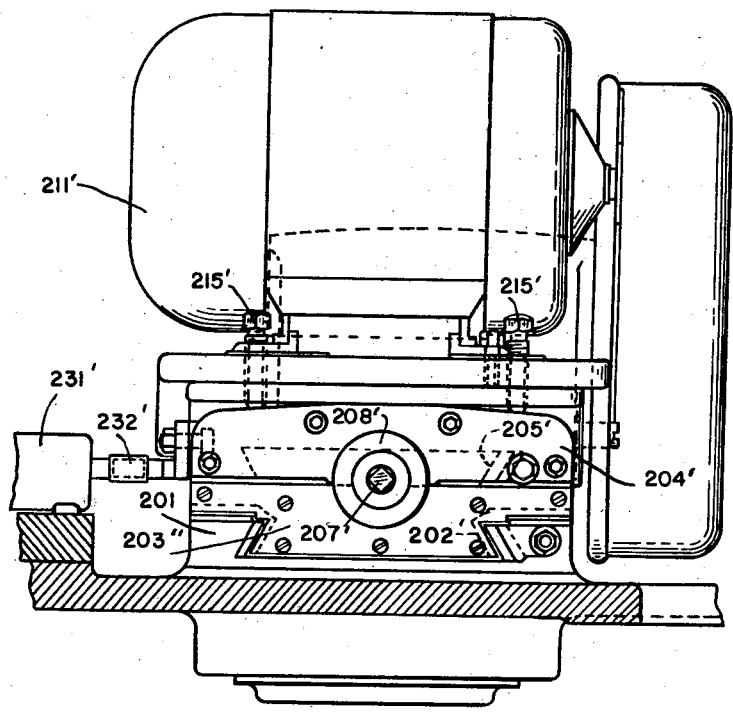
Figure 16 is an end elevation of the left-hand cutter assembly.
Figure 18:
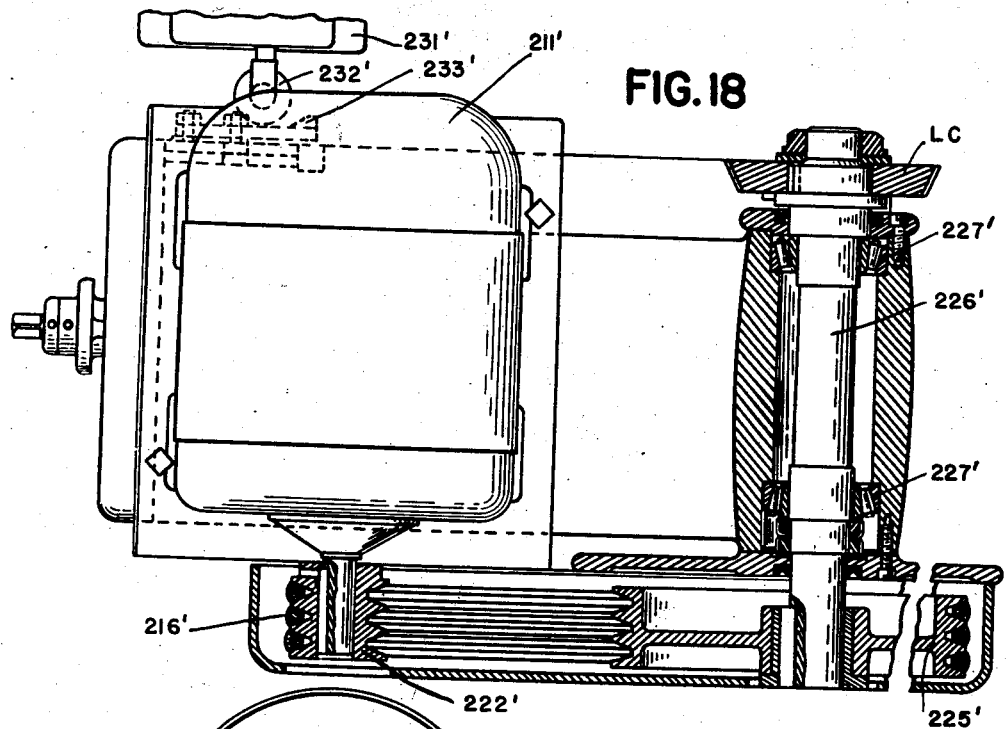
Figure 18 is a section on the line 18—18 of Figure 17.
Figure 17:
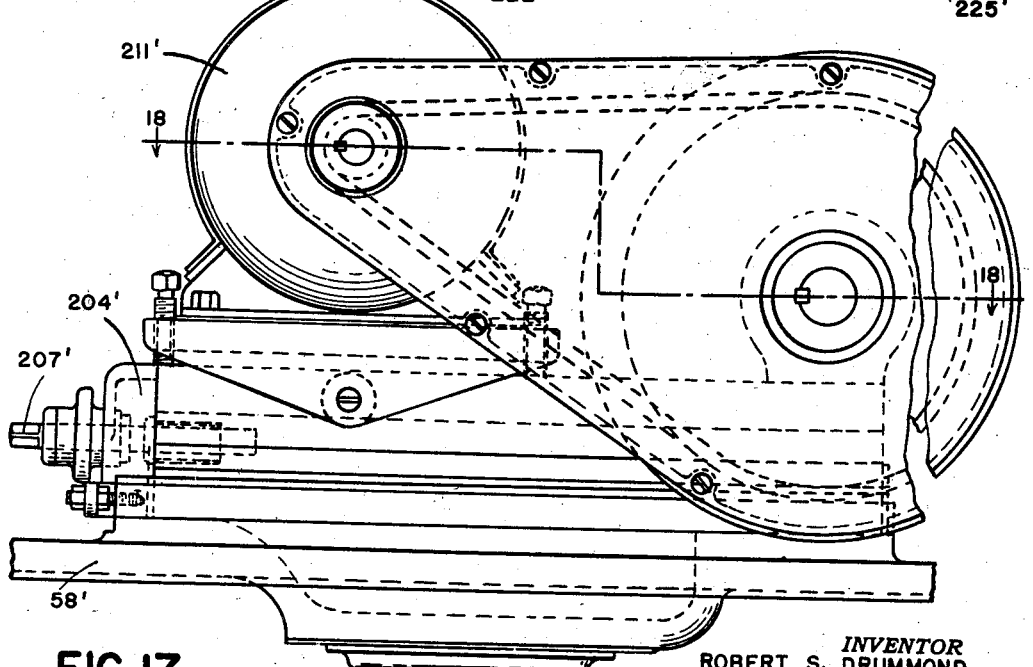
Figure 17 is a side elevation of the left-hand cutter assembly.

In Figures 16 to 18, I have illustrated the left-hand cutter and the reference numerals applied thereto correspond to the reference numerals applied to Figures 13 to 15 illustrating the right-hand cutter head assembly except that the same have been primed. The arrangement of the two cutter heads are broadly similar and no description will be given of the left-hand cutter head assembly except to point out that the motor 211' is directly connected to the sheave 222' rather than through the intermediacy of reduction gearing. The operation and adjustment of the two cutter heads are identical.

As shown in Figures 16 and 18, a limit switch 231' is mounted on the frame in position to be actuated by a cam or lug 233'. Switch 231' has a spring pressed, roller equipped plunger 232'. Switch 231', when actuated on the return stroke of the carriage, interrupts operation of all motors carried by the corresponding panel, and marks the termination of the cutting cycle of that panel. The next cycle is initiated by actuation of switch 152 by cam 150, shown in Figures 23 and 24. Switches 152 and 231' operate suitable relays, and a detailed explanation of the circuits are believed unnecessary.

*Feed drive assembly*

The mechanism for driving both cutter heads is illustrated in Figures 19 to 22.

As indicated in Figure 1, the mechanism for driving the reciprocating tool carriages indicated generally at 600 is driven by a motor mounted on the outside of the panel 58'. The mechanism associated with the motor and with the reciprocating tool carriages is for the most part on the inside of the column.

Figure 20:
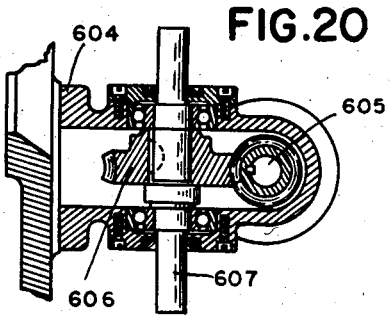
Figure 20 is a section on the line 20—20 of Figure 19.
Figure 19:
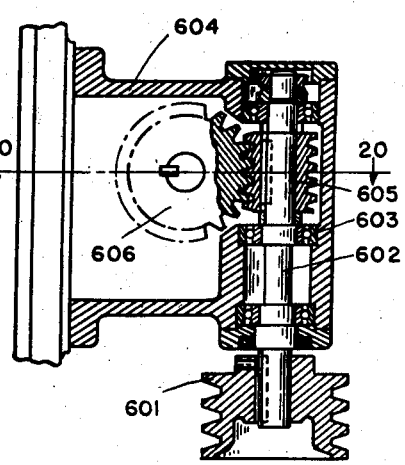
Figure 19 is an axial section through the drive shaft of the feed drive mechanism.

As best seen in Figures 19 and 20, the feed drive motor is connected to a sheave 601 through registering apertures in the column and in the panel 58'. The sheave 601 is connected to a shaft 602 by suitable securing means. A housing 604 is connected to the inside of the column and is adapted to house a portion of the gear train which interconnects the sheave 601 and the cams 620 and 621 which are eventually driven thereby. Journaled in the housing in suitable bearings 603 is the shaft 602 to which is keyed or otherwise secured a worm 605. Also journaled in the same housing is a shaft 607 to which is keyed a worm wheel 606, the worm wheel being arranged in meshing engagement with the worm 605.

The shaft 607 extends from both sides of the housing 604 and is adapted to be connected to two separate feed drive mechanisms. This arrangement is illustrated in Figure 21 where the shaft 607 is shown connected through the flexible couplings 608 to shafts 609. The feed drives associated with shaft 609 include a housing 610 in which is journaled in suitable bearings 616 and 617 a shaft 618. Connected to the shaft 618 by keys is a hub 619 to which is bolted or otherwise secured a gear 613. The gear 613 is adapted to mesh with a worm 612 which is keyed to shaft 609.

Rotation of the motor drives the sheave 601 and through the gear train which includes worm 605, gear 606, and two shafts 609, each driving through a worm 612 and gear 613 to rotate two shafts 618, only one of which is seen in Figure 21. Each shaft 618 is connected to a pair of cams as later described, and each controls movement of an associated tool carriage.

The housing 610 is mounted internally of the column at a point just under the mounting for the carriages which carry the cutting tools. A chamber 241 is provided on panel 58' and a pair of feed posts 250 and 251 which are rigidly secured to the slide of the feed carriage project into this space.

Connected to the outer end of the shaft 618 are a pair of cams 620 and 621 whose shape is best illustrated in Figure 21. The feed posts 250 and 251 are formed to cooperate with the cams, as best seen in Figure 22. The feed post 251 engages the cam 620 and the shape of the cam is such that upon rotation of the cam the feed post is moved in a direction to move the tool carriage toward the work. The feed post 250 has a cut-out portion to receive the cam 620 without engaging therewith and has an upward portion adapted to be engaged by the cam 621. This last feed post and cam is provided for the purpose of returning the carriage after completion of a cutting stroke. As can be seen in Figure 21, the cams and feed posts are so arranged that one cam is at all times driving its corresponding feed post. This results in a positively controlled feed stroke and a positively controlled return stroke. The shape of the cam 620 is such that for a predetermined rate of rotation of the driving motor the desired rate of feed of the cutting tool into the work will result.

The foregoing describes how one carriage is driven from shaft 609, reciprocation being positive in either direction through cams 620, 621. The other end of shaft 609 positively moves the cooperating tool carriage through a similar but differently shaped pair of cams driven by gear 613.

The outer portion of the shaft 618 and the inner diameters of the cams 620 and 621 are provided with relatively fine corrugations which serve to connect the cams to the driving shaft and which also provide for relative adjustment of the cams. This is accomplished by withdrawing the cams from the driving shaft and replacing them thereon at the desired adjusted position.

A retainer plate 614 is secured to the inner open end of housing 610 by means of bolts 615 or other suitable securing means and serves to close the housing as well as retain the ball race which carries the bearings 616 in position.

By a proper design of cam the feed may be accurately controlled as to velocity and the return stroke may be, if desired, relatively fast as compared to the feed stroke. The cams are readily removable and cams of different contour may be substituted in order to provide various feeding rates.

*Starting controls and coolant valve*

Controls for the motors carried by the panels 58' are illustrated in Figures 23 and 24. A plurality of switches 152 are carried by the rotatable column. Each switch 152 is adapted to initiate operation of the four motors carried by the corresponding panel. The switch includes a bracket 160 with a link 158 pivoted thereto as shown and a roller 154 secured to the opposite ends of the link. Connected to the link 158 is a plunger 156 which is adapted to operate the switch mechanism. The rollers 154 are positioned such that upon rotation of the table and column they will be moved in a circular path which will be intersected by a stationary cam 150 secured to the stationary tube 30. The cam 150 is adjustably mounted and for this purpose arcuate slots 166 are provided by means of which the cam is adapted to be clamped to the supporting structure in adjusted position by means of stud bolts 164. Adjustment is obtained by means of bolts 170 threaded through apertures in the cam 150 and engaging a stud 168 which projects through an enlarged aperture in the cam.

As will be readily apparent from the foregoing, rotation of the table causes sequential operation of the switches 152. In other words, as the table and column rotate the motors on each panel will be started as their controlling switch 152 passes stationary cam 150.

In the cutting operation performed by my improved shaving machine it is necessary to provide a stream of coolant at the cutting point. For this purpose and by mechanism previously described, a flow of coolant under pressure is constantly delivered to the manifold 80 and from this manifold by conduits 82 to the interrupted annular space 87 in the coolant valve 86. Spaced at 90° intervals about the coolant valve and carried by a coolant exhaust manifold 94 are four nipples 97 each connecting to a conduit 98 which leads to the point of cutting operation on the corresponding panel. The position of the coolant valve is predetermined with relationship to the starting cam 150 and the relationship is such that the supply of coolant is cut off as the panel under consideration passes the loading station. At this time, due to the operation of limit switch 231' the rotation of the work and of the cutting tools is stopped.

Also, as seen in Figure 23 at 492, is the cam which operates the headstock retracting mechanism. The position of this member relative to the coolant valve and to the starting cam 150 is also accurately predetermined so that the sequential operation of the machine is accurately predetermined.

*Operation*

The operation of my improved multiple station shaving machine should be apparent from the foregoing description but will be briefly reviewed here. Upon initiating operation of the machine a suitable switch (not shown) is actuated which starts rotation of the main drive motor 110 as well as the coolant feed pump motor 52. These motors operate continuously while the machine is in operation. The main drive motor 110 drives the worm 148 which meshes with the circular rack 70 and constantly rotates the table 60, the column 57 and the plurality of panels 58' associated with each side of the column. The coolant pump motor 52 continually drives the coolant pump and a supply of coolant is forced to the 270° annular space 84 in the coolant valve 86. This space is in constant communication with three (in the embodiment shown) of the four conduits 98 leading to the respective cutter heads.

The machine may be designed to operate at any desired or convenient speed but I have found that the specific embodiment illustrated is best adapted to complete a revolution of the table and column in about 28 seconds. Since four cutting assemblies are provided this provides a maximum interval of seven seconds for the operator to unload a finished work piece and to replace it with a work piece to be finished as the particular panel passes the loading station.

In initiating operation it is assumed that all of the panels are unloaded. As the first panel enters the loading station the cutter heads are in retracted position and the limit switch 231' has been operated to shut down all of the motors carried by the panel. As the table and column enter the loading position the cam follower 491 encounters the stationary cam 492 and operates to raise the automatic headstock. The coolant valve has at this time shut off the flow of coolant to the cutter heads on this panel. It is necessary only for the operator to take a work piece to be finished and place the same with portions engaging the inclined guiding surfaces 548 of the tailstock. The next step is to then lower the work piece upon the tailstock where it will be accurately centered by the pin 536. The top of the work piece is then swung toward the headstock which is in retracted position until the end of the work piece is engaged by the leaf springs 449. These springs are of sufficient strength to hold the work piece in vertical position against the guiding surfaces 448.

Continued rotation of the table and column moves the cam follower 491 out of engagement with the cam 492. Motion of the headstock towards engaging position of the work piece is directly downward and gravity tends to move the headstock toward this position. Such movement, however, is prevented by the double acting fixture lock 473. It is necessary for the operator by manipulation of the handle 474 to release the fixture lock and to return the headstock to operative position.

As the headstock moves downwardly the automatic clutch previously described engages the end of the work piece. This clutch includes tapered rollers 438 and when the work piece has firmly engaged these rollers the clutch assembly is moved upwardly within the space 420' until the headstock center 422 engages a correspondingly shaped part on the work piece accurately centered on the same. It will be understood that upward motion of the clutch relative to the center 422 is actually brought about by a downward motion of the headstock spindle while the clutch assembly is held stationary against the upper end of the work piece.

Continued rotation of the table and column eventually causes the engagement of cam follower 154 and stationary cam 150 which initiates simultaneous operation of the four motors carried by the corresponding panel. The motors carried by the tool carriages are positively connected to the tools by gearing and flexible connectors, as previously described. Rotation of the headstock motor causes rotation of the work piece by means of the conventional friction clutch. Rotation of the motor connected to the feed drive starts translation of the tool carriages along their ways toward the work piece. The final translation is at a predetermined slow rate, in accordance with the desired rate of cutting. Since the work piece and the cutting tools are both rotating a cutting action takes place on the surfaces to be finished. This cutting action in the type of machine disclosed is itself novel and has been more fully described in applicant's copending application referred to.

Due to the operation of the cams and cooperating feed posts the feed movement is interrupted when the tools have cut to the predetermined desired depth and the carriages are then returned to retracted position at a desired rate. Return of one of the carriages causes operation of the limit switch 231' which stops rotation of the four motors carried by that panel. Continued rotation of the driven parts due to inertia is stopped by means of the friction relay previously described. Limit switch 479 prevents further motor actuation until the headstock is in engagement with the work.

The operation of a single mechanism comprising a work support and associated tool supports may be considered as involving a separate cycling means for each mechanism effective to move the tools in plunge cutting relation and to terminate a cycle by actuating switch 231'. The cycle of each mechanism is initiated by a single control member, the cam 150. The switch 479 then prevents further automatic control until actuated by lever 474 incidental to gripping a new work piece.

Completion of the return stroke and consequent stopping of the various driving motors occurs just prior to the re-entry of the panel under consideration into the loading zone. At this time, as the panel again enters the loading zone, flow of coolant to the cutter heads is cut off and due to the next operation of the headstock retracting means the finished work piece is supported on the tailstock 500 and with its upper end loosely held by means of the leaf springs 449. At this second passing of the panel under consideration through the loading zone the operator's duties are precisely similar to those previously described except that he must first remove the finished work piece from the machine. This is accomplished by simply withdrawing the top of the work piece from the leaf springs and lifting the same from the tailstock.

It is desired to call attention here to an important feature of the construction which I have just described. As will be noted, the panels 58' are independently and removably mounted on the column. In addition, each panel carries the complete assembly of surface finishing mechanism, namely, a tailstock 500, a power headstock 400, and cutter and motor assemblies 200 and 200'. Each panel is therefore a complete operating assembly and it is possible to remove a single panel for repair or other purposes without disturbing the operation of the remaining panels. Each panel carries in addition to its surface finishing mechanism the necessary motors for operating the mechanism and in addition, control means for the motors and control means for actuating the power headstock. The various control means, namely, the switch 152 and the headstock and its controlling mechanism including the gear 476 and associated parts, are adapted to be operated from a single operating means which includes the cam 492, and the switch actuator 150. Omission of a single panel therefore does not affect the timed and interrelated control of the remaining panels by the control means just mentioned.

From the foregoing it will be apparent that I have devised a new and improved surface finishing machine which permits a single operator to multiply his productiveness. The machine is entirely automatic in operation, the only step which requires the attendance of an operator being the simple step of removing the finished work piece and replacing it with a piece to be finished.

Single station machine

In the single station machine illustrated in Figures 25 to 33 certain changes are made in the arrangement and cooperation of the cooperating mechanism. Referring first to Figures 25 to 27, the machine comprises a frame 700 having a forwardly and upwardly extending apron 701 providing a receptacle for oil. The machine essentially comprises work supporting means including a vertically adjustable tailstock 702 and a power headstock 703. The tailstock 702 includes a center 704 which is vertically adjustable by appropriate mechanism within the tailstock 702, actuated by a manually movable lever 705. In order to allow for different lengths of work pieces W, the tailstock 702 as a whole is vertically adjustable on the frame, suitable ways 706 being provided. The tailstock 702 has clamping means, such as bolts 707, for securing the tailstock in vertically adjusted position. It will be appreciated that this adjustment of the tailstock as a whole is made only when setting up the machine for different work pieces. In finishing a series of identical work pieces the only adjustment of the tailstock is vertical movement of the center 704 by means of the lever 705.

Located directly above the tailstock 702 is the power headstock 703, previously referred to. The center 710 of the power headstock has associated therewith a work rotating fixture 711 which is designed to cooperate with the particular work piece being finished. The center 710 of the headstock is rotated from a motor 712 secured to the rear of the frame 700. As indicated in Figure 26, the motor 712 has an axially extending drive shaft 713 connected to a flexible coupling 714. A second shaft 715 is also connected to the flexible coupling 714 and has associated therewith transmission means for rotating a spindle (not shown) associated with the center 710 of the headstock. The transmission means may conveniently take the form of a pair of sheaves and a V-belt associated therewith. At 716 I have indicated a friction relay of conventional type for plugging the motor 712. By this arrangement the motor 712 when deenergized is brought to rest almost instantaneously.

Suitable means are provided for circulating coolant to the work and cutters and includes a pump motor 717 connected by means of a flexible coupling 718 to a coolant pump 719 of suitable design. The arrangement is such that coolant is supplied to the work at the point where the cutting operation occurs and coolant is collected in a sump and returned by means of the coolant pump. The coolant pump is preferably controlled concurrently with the work drive motor 712 so that when rotation of the work stops for removal of the finished work piece and for reloading, the supply of coolant is stopped at the same time.

Referring again to Figure 25, I have illustrated a pair of tool slides or carriages 720 and 721. These are essentially identical, and only one will subsequently be described in detail. The tool carriage 720 is mounted in suitable ways (not shown in this figure), and means are provided for moving the carriage toward and away from the work support in plunge cutting relation. The cutter 722 is carried by the carriage 720 and a cutter 723 is carried by the carriage 721. Movement of the carriage 720 is in the direction of the arrow 724, and movement of the carriage 721 is in the direction of the arrow 725. The cutter 722, as indicated in Figure 25, is of double conical shape and is therefore adapted to finish the surfaces 726 and 727 simultaneously. In like manner the cutter 723 is adapted to finish the surfaces 728 and 729 simultaneously.

Reference was previously made to the fact that the carriages were operated in plunge cutting relation. In addition the carriages are operated simultaneously, as will later be described in detail. The plunge cutting relation referred to consists in feeding the cutter into the work, reducing the rate of feed near depth, providing the dwell at depth to finish the surface of the work piece with great accuracy, and feeding the tool away from the work piece. During the cutting operation both the cutter and work piece are rotated at relatively high speeds, as more particularly set forth in my Patent 2,206,770, entitled "Surface shaving."

Figure 28:
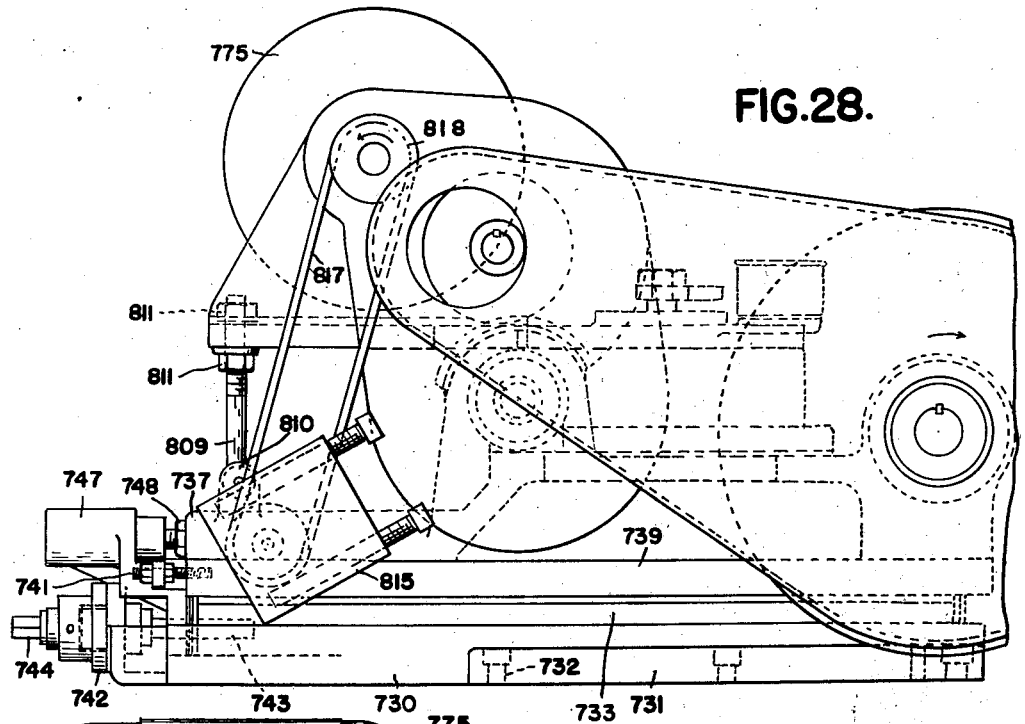
Figure 28 is a rear elevation of one of the tool slides employed in the machine illustrated in Figure 25.

Referring now more particularly to Figures 28 et seq., one of the tool carriages will be described in detail. These figures illustrate the right-hand tool carriage shown in Figure 25. A supporting base 730 is provided on the machine, flanges 731 being integrally formed thereon for attachment to the frame. In Figure 28 I have indicated openings 732 for the reception of countersunk bolts for attaching the supporting base to the frame 700. An intermediate slide 733 is provided and is relatively adjustable to the supporting base 730. For this purpose the supporting base 730 is provided with ways indicated generally at 734 for the reception of a key 735 projecting downwardly from the intermediate slide 733. Intermediate slide 733 is also provided with an upwardly projecting, longitudinally extending key 736 for a purpose which will subsequently be described. The tool slide or carriage proper is indicated at 737 and is formed to receive key 736 in accurately guiding, sliding relation. For this purpose the slide 737 is provided with a depending, guiding element 738 appropriately secured to the slide 737. A corresponding element 739 is provided on the opposite side of the slide 737. Assembly is permitted by a removable gib 740 in accurately interfitting relation between the upwardly projecting key 736, and the element 739. The removable gib 740 is bolted or otherwise secured to the depending element 739, as indicated at 741.

Means are provided for adjusting the intermediate slide 733 relative to the supporting base 730, and these take the form of a bracket 742 which carries a threaded bolt 743 received with a correspondingly threaded recess in the intermediate slide 733. The outwardly extending end of the bolt 743 is square, as indicated at 744, and, as will be evident, rotation of this element results in a corresponding sliding adjustment between the intermediate slide 733 and the base 730.

Figure 30:
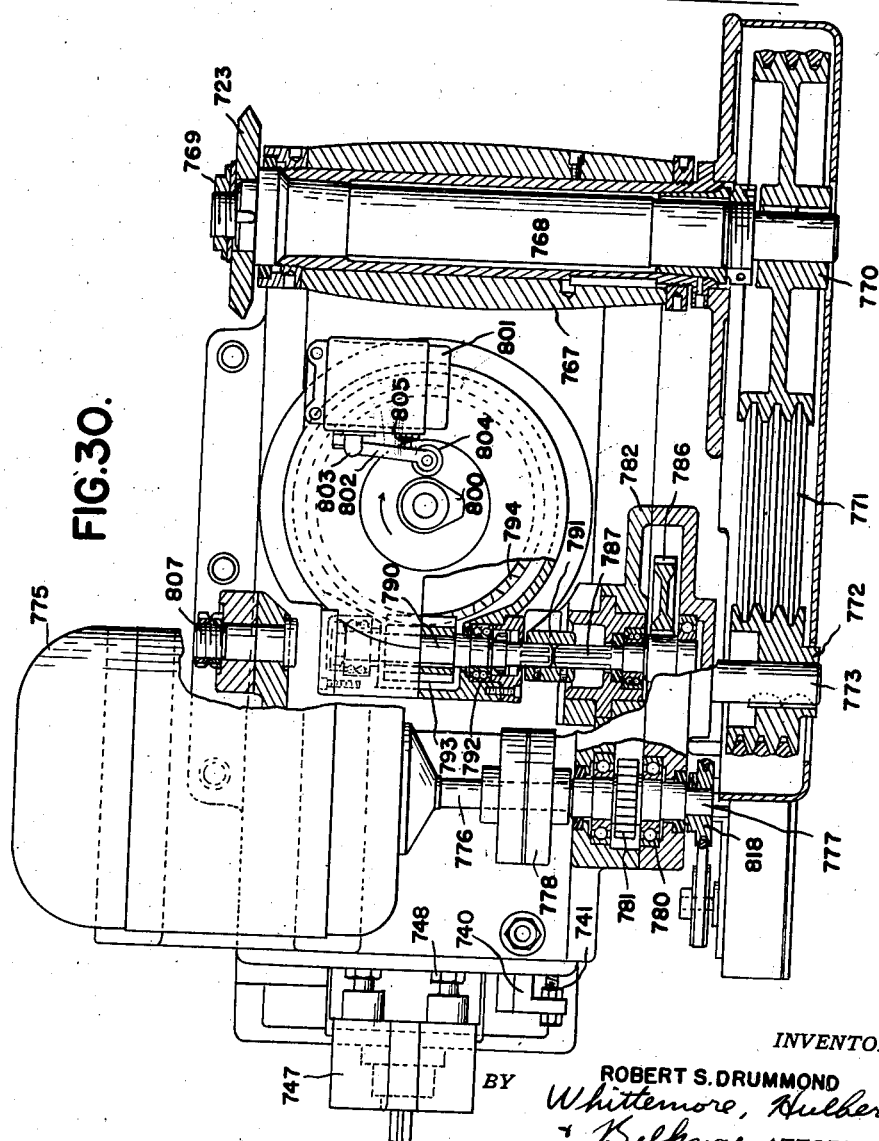
Figure 30 is a top plan view, partly in section, of the tool slide shown in Figure 28.

Bolted or otherwise secured to the intermediate slide 733 is a bumper assembly 747. The bumper assembly is thus rigidly supported from the intermediate slide and is provided with adjustable bolts 748 which serve as bumpers to arrest relative movement of the tool slide 737 to the left as indicated in Figures 28 and 30.

As will be appreciated, initial adjustment of the machine for a particular job includes adjusting the intermediate slide 733 to desired position relative to the base 730. The actual travel of the tool slide 737 during operation of the machine is therefore relative to the initially adjusted intermediate slide 733. The means for providing the feeding movement of the cutter slide 737 is best illustrated in Figure 32. In this figure the supporting base 730 is omitted for clearness and the intermediate slide 733 and the tool slide 737 are clearly shown. Rigidly supported in the intermediate slide 733 are a pair of posts, a feed post 750 and a return post 751 being provided. These posts are recessed at their lower portions within the depending key 735 of the intermediate slide 733, and in Figure 33 they are indicated as bolted therein, as shown at 752. The feed post 750 projects upwardly into a space provided within the tool slide 737 and closed at its top by means of a housing 753. As best seen in Figure 33 the upper portion of the feed post 750 is rounded as indicated at 754 for cooperation with a cam 755. In like manner the return post 751 has portion 756 projecting above the upper surface of the intermediate slide 733 and associated with a cam 757. The cams 755 and 757 are secured to a rotatably mounted shaft 758 by suitable securing means indicated at 759. The cams 755 and 757 are mounted in vertically spaced relation and the cam 756 terminates short of the bottom of the upper cam 755. Also, as seen in Figure 32, clearance is provided so that when one of the posts, as for example the post 750, is in contact with one of the cams, as cam 755, clearance is provided between the other cam 757 and the other post 756.

In order to insure accuracy in control of the feeding motion, compression springs 760 are provided within elongated openings formed adjacent the side edges of the intermediate slide 733. Pins 761 rigidly secured within the tool slide 737 have lower portions 762 depending into the slot 763 which houses the springs 760. As indicated in Figure 33, four such springs are provided, all urging the tool slide 737 to the left, as seen in Figures 32 and 33. This insures that the cam 755 will be engaged with the post 750 during the feeding operation and also tends to return the tool slide 737 after completion of the cutting operation without calling upon the return cam 757 and return post 751. The return post, however, insures positive withdrawal of the tool from the work piece after completion of the cutting operation.

The cams 755 and 757 have contours as indicated in dotted line in Figure 33, and it will be evident that rotation of the cams in a counterclockwise direction as seen in Figure 33 results in reciprocation of the slide 737 toward and away from the work piece.

A headed set screw 765 is provided within a threaded opening 766 in the tool slide and may be threaded inwardly to engage the return post 751 as indicated in dotted line in Figure 32. During operation of the machine the set screw must be flush with the end of the tool spindle housing 767 to prevent interference.

The tool slide 737 has formed thereon a tool spindle housing 767 in which the tool spindle 768 is mounted for rotation. Tool 723 is removably secured to the spindle 768 by suitable means indicated generally at 769. The spindle 768 has keyed or otherwise secured thereto a sheave 770 adapted to be driven by a V-belt 771 as shown in Figure 30. A second sheave 772 is keyed or otherwise secured to a shaft 773, whereby rotation of the shaft 773 will result in rotation of the tool spindle 768 and the associated tool 723.

The means for rotating the tool spindle 768 and for driving the tool slide 737 in plunge cutting relation includes the motor 775 having an axial shaft 776 projecting therefrom and connecting to a shaft 777 by means of a flexible coupling 778. As indicated in Figure 30, the shaft 777 is mounted in ball bearings indicated generally at 780, and in addition has a driving gear 781 keyed or otherwise secured thereto.

The spindle 777 which connects to the motor 775 through the flexible coupling 778 is mounted in a transmission housing 782, ball bearings 780 previously referred to being shown also in Figure 31. The shaft 777 is provided with a pinion or gear 781, which in turn meshes with a larger gear 783 keyed or otherwise secured to the shaft 773. The shaft 773 is also provided with ball bearings 784 and is adapted to have keyed or otherwise secured thereto a driving sheave 772 previously referred to. In addition the shaft 773 has keyed or otherwise secured thereto a transmission gear 785 which is in mesh with a second transmission gear 786 carried by a shaft 787. The shaft 787, as seen in Figure 30, is adapted to be connected to a second coaxial shaft 790 by means of a splined connection 791. The shaft 791 is mounted in suitable ball bearings indicated at 792, and has keyed or otherwise secured thereto a worm 793 in mesh with a worm gear 794, best seen in Figure 32. As seen in this figure, the worm 794 is keyed or otherwise secured to the cam shaft 758, previously described. The cam shaft 758 has lower ball bearings 795 retained in place by a plate 796, bolted or otherwise secured to the housing 753. A second ball bearing 797 is provided for the upper end of the shaft 758 and is mounted in a closure 798 secured to the open upper top of the housing 753.

From the foregoing it will be evident that rotation of the motor 775 results in a rotation of the shaft 777 and the driving gear 781. The driving gear 781 rotates a gear 783, which in turn rotates the shaft 773. Secured to a stub end of the shaft 773 is the drive sheave 772 which drives the tool sheave 770 and results in the rotation of the tool. Rotation of the shaft 773 also drives the gear 785, which in turn drives the intermediate gear 786 and the shaft 787. Rotation of the shaft 787 through the medium of the worm 793 and the worm gear 794 results in a correspondingly slow rotation of the cam shaft 758.

As best seen in Figures 30 and 32, a cam 800 is secured to the upper end of the cam shaft 758 and is adapted to actuate a relay 801. The relay 801 is carried by the closure 798 of the housing 753 and is provided with an arm 802, pivoted as indicated at 803 and having a roller 804 adapted to engage the surface of the cam 800. A plunger 805 extends from the casing of the relay 801 and is adapted to be engaged by the arm 802. The function of this relay will later be described.

Figure 29:
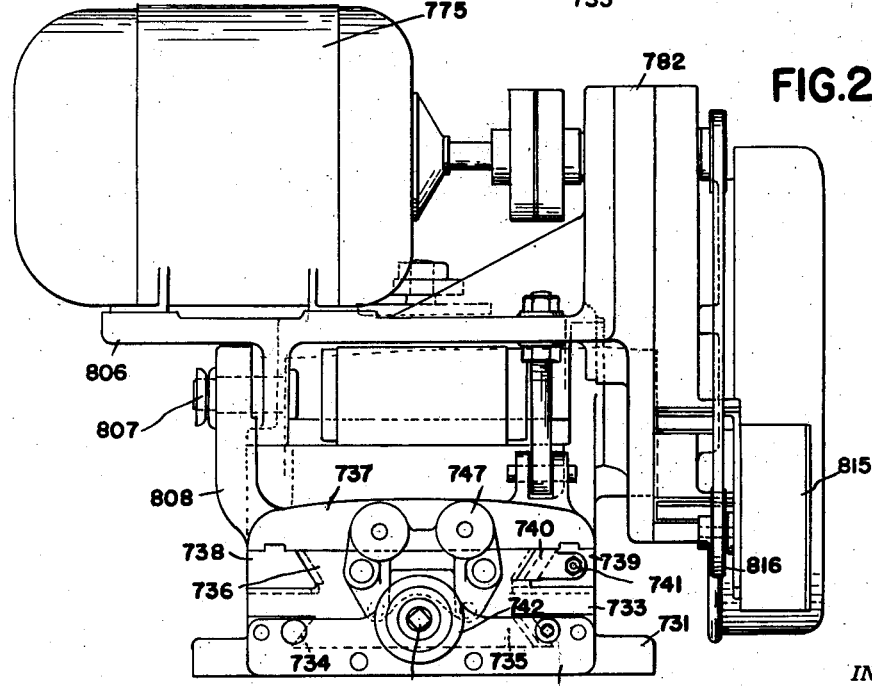
Figure 29 is a side elevation of the tool slide shown in Figure 28.

Referring now to Figures 28 and 29, the motor and its associated parts is carried on a platform 806 which is pivotally mounted as indicated at 807 to an arm 808 extending upwardly from the tool slide 737. Movement of the platform 806 about the pivot axis of the connection 807 is provided by means of a link 809 mounted between ears 810 projecting upwardly from the tool slide 737. The link 809 is threaded and has associated therewith a pair of lock nuts 811. An enlarged opening is provided through the platform 806 through which the link 809 extends. As will be evident, adjustment of the lock nuts 811 up and down provides a rocking movement of the platform 806 about the pivot axis of the support 807.

As will be evident, this rocking movement of the platform 806 may be employed to tighten the V-belts 771 interconnecting the sheaves 770 and 772. It will be observed that the pivot connection 807 is coaxial with the shafts 787 and 790, so that this rocking motion is permitted without affecting the proper meshing relationship of the train of gears interconnecting the motor drive shaft and the ultimately driven mechanism.

Referring particularly to Figure 28, I have indicated at 815 a plugging relay mounted on the gear casing 782 and provided with a sheave 816 (Figure 29) adapted to be driven by a belt 817 from a sheave 818 secured to the outer end of the shaft 777. This relay is arranged to provide for substantially instantaneous stopping of the motor 775 upon completion of a cycle.

As will be evident from the foregoing, the machine is provided with four motors, a work drive motor and a motor for supplying coolant being operated concurrently. Each of the tool slides or carriages has mounted thereon a single motor which is adapted both to rotate the tool and to provide for accurately controlled plunge feeding of the tool into the work and return. In this type of machine it is important that the tools be operated in closely related relation, and I have arranged the controls for the various motors so that this result may be accomplished.

It will be understood that each of the tool carriages is provided with a relay 801 which is adapted to be actuated in timed relation to rotation of the cam shaft. The parts are arranged so that the relay 801 is actuated upon return of the tool slide to its initial position after completion of a cutting cycle. The circuits controlling the various motors are arranged such that each relay 801 is adapted to deenergize the motor carried by the corresponding tool slide but the work drive motor, and the coolant motor are continued in operation until both of the tool drive motors are deenergized. In other words, stoppage of one tool motor upon return of its corresponding tool slide to its initial position does not deenergize the work motor, which continues to operate until the other tool drive motor is stopped. By this means, even though during a single cycle the tool carriages get out of step, the initiation of the next succeeding cycle will find the parts properly correlated. If this means were not provided, and if for one reason or another one of the tool carriages tended to complete its cycle in a shorter interval than the other tool carriage, it will be apparent that this error would be additive so that eventually the tool carriages would be completely out of step. According to the present arrangement, however, each tool carriage is stopped substantially instantaneously upon completion of its cycle, even though the other tool carriage has not as yet completed its cycle. The parts are further arranged so that upon starting, which is automatically controlled by a single starting button, all motors are simultaneously energized and all are at that instant in proper phase. The fact that one tool motor may get slightly out of step with the other tool motor during a single operation is not important.

Figure 34:
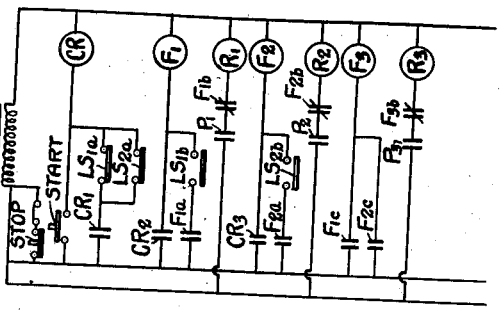
Figure 34 is a wiring diagram of a simplified circuit employed in the present machine.

In Figure 34 I have illustrated a simplified wiring diagram adapted to perform the functions previously referred to. The wiring diagram illustrated in Figure 34 is to be regarded merely as illustrative of one of the many circuit arrangements which could be employed to produce the results previously described.

In this figure I have indicated a transformer $T_r$ which is adapted to supply low voltage current to the switches and relays which control the motor circuits. Start and stop buttons are provided as indicated and when the start button is depressed a circuit will be completed through the relay CR. The relay CR controls a plurality of switches $CR_1$, $CR_2$ and $CR_3$. These switches, as indicated in the diagram, are normally open and are maintained closed only so long as the relay CR is energized. Closure of the switch $CR_1$ as a result of the energization of the relay CR supplies holding current to the relay CR through switches $LS_{1a}$ and $LS_{2a}$ which are controlled by the actuator 800 shown in Figure 32. Limit switches $LS_{1a}$ and $LS_{2a}$ are closed upon termination of the cycle. At this time the contacts $LS_{1b}$ and $LS_{2b}$ are opened. Contacts $LS_{1a}$ and $LS_{1b}$ are mechanically interconnected, and contacts $LS_{2a}$ and $LS_{2b}$ are mechanically interconnected.

The relay CR is maintained energized as the start button is released by means of current passing through the switch $CR_1$ and either of the switches $LS_{1a}$ or $LS_{2a}$. Closure of the switch $CR_2$ energizes relay $F_1$ which actuates suitable contacts (not shown) which connects one of the tool drive motors to the line to drive the same in a forward direction. Energization of relay $F_1$ closes normally open contact $F_{1a}$ and opens normally closed contact $F_{1b}$. Closure of the contact $F_{1a}$ sets up a holding circuit for relay $F_1$ which will be completed when limit switch $LS_{1b}$ is closed. Limit switch $LS_{1b}$ is closed as $LS_{1a}$ is opened immediately after the corresponding tool drive motor starts to rotate.

When limit switches $LS_{1a}$ and $LS_{2a}$ open, the holding circuit through the relay CR is opened, and switches $CR_1$, $CR_2$ and $CR_3$ all open.

It will be observed that the relay $F_1$ remains energized until such time as the limit switch $LS_{1b}$ is mechanically opened, as it will be upon the completion of the cycle by the corresponding tool slide.

In identical manner, closure of the normally open switch $CR_3$ energizes relay $F_2$, thus closing normally open switch $F_{2a}$ and setting up a holding circuit which will be completed when limit switch $LS_{2b}$ moves to closed position as it does immediately after starting of the corresponding tool drive motor. The tool drive motor has contacts (not shown) connected to the relay $F_2$ which are adapted to connect the motor to the line to drive the same in a forward direction. It will be observed that the tool motor controlled by the relay $F_2$ remains energized until the limit switch $LS_{2b}$ is mechanically opened, as it will be at the end of the cycle of that particular tool slide.

When either of the relays $F_1$ or $F_2$ is energized, the corresponding normally open switch $F_{1c}$ or $F_{2c}$ which are connected in parallel are closed, thus completing a circuit to the relay $F_3$. The relay $F_3$ controls motor contacts (not shown) which are adapted to connect the work drive motor and the coolant motor to the line so as to drive the same in a forward direction. It will be recalled that relays $F_1$ and $F_2$ remain energized until the completion of the cycle of their respective tool slides. Accordingly, since normally open contacts $F_{1c}$ and $F_{2c}$ are in parallel the relay $F_3$ will remain energized as long as either the relay $F_1$ and $F_2$ are energized.

I have further indicated plugging relays adapted to momentarily reverse the current to the two tool drive motors and to the work drive and coolant motor so as to stop the same instantly. These means take the form of reversing relays $R_1$, $R_2$ and $R_3$ which are provided with normally closed contacts $F_{1b}$, $F_{2b}$ and $F_{3b}$ respectively controlled by the corresponding relays $F_1$, $F_2$ and $F_3$. When the respective relays $F_1$, $F_2$ and $F_3$ become deenergized as described above, the normally closed contacts just referred to close, and mechanical means are provided for closing the switch contacts $P_1$, $P_2$ and $P_3$, thus completing circuits to the relays $R_1$, $R_2$ and $R_3$ respectively. Closure of switches $P_1$, $P_2$ and $P_3$ is only momentary and serves merely to bring the respective motors to rest.

According to the present invention three motors are provided which perform five distinct functions. The work drive motor rotates the work, each of the two tool drive motors rotates its corresponding tool, and in addition drives the corresponding tool carriage in plunge cutting relation. Furthermore, the parts are so correlated that the cutting operation is performed simultaneously by each of the two tools without the necessity for mechanical interlinkage between corresponding tool carriages. Accordingly a much more flexible operation results in that each tool carriage and its associated mechanism may be set and adjusted to perform its particular function without reference to the other tool carriage. Thus, for example, if one of the tools has considerably more metal to remove than another of the tool carriages, as is often the case, that tool carriage may be arranged to take a substantially longer interval to complete its cycle than the other tool carriage.

While I have illustrated two specific modifications of my invention, this has been done merely to enable those skilled in the art, without further experimentation, to practice the invention the scope of which is indicated by the appended claims.

What I claim as my invention is:

1. In a surface shaving machine, a tool slide, a base having ways in which said slide is movable, transmission means carried in part by said slide and in part by said base including a pair of rotary cams, a feed post and a return post cooperating with said cams, a motor for rotating said cams, and means actuated upon completion of return movement of said slide to stop said motor.

2. In a machine tool having a work support, a plurality of tool supports, a work drive motor, and a plurality of independent tool drive motors, whereby each tool has an independent cycle, controls for said motors comprising means to arrest each of said tool drive motors independently upon completion of its separate cycle, and to arrest said work drive motor simultaneously with the last of said tool drive motors to complete its cycle.

3. In a machine tool having a work support, a plurality of movable and rotatable tool supports, a work drive motor, and a plurality of independent tool drive motors, whereby each tool has an independent cycle, controls for said motors comprising means to arrest each of said tool drive motors independently upon completion of its separate cycle, and to arrest said work drive motor simultaneously with the last of said tool drive motors to complete its cycle, each of said tool drive motors adapted both to rotate and to feed one of said rotary tool supports.

4. A surface shaving machine for relatively feeding a rotating cutter and work piece in plunge cutting relation which comprises a rotary support, a motor for rotating said support, a carriage movable toward and from said support, a second rotary support on said carriage, transmission means for moving said carriage, a motor on said carriage, and connections intermediate said last motor and said second rotary support and said transmission means for rotating said second rotary support and for driving said transmission means.

5. A surface shaving machine for relatively feeding a rotating cutter and work piece in plunge cutting relation which comprises a rotary support, a motor for rotating said support, a carriage movable toward and from said support, a second rotary support on said carriage, transmission means for moving said carriage, a motor on said carriage, and connections intermediate said last motor and said second rotary support and said transmission means for rotating said second rotary support and for driving said transmission means, said transmission means comprising a pair of cams and a cam follower associated with each cam.

6. A surface shaving machine for relatively feeding a rotating cutter and work piece in plunge cutting relation which comprises a rotary support, a motor for rotating said support, a carriage movable toward and from said support, a second rotary support on said carriage, transmission means for moving said carriage, a motor on said carriage, and connections intermediate said last motor and said second rotary support and said transmission means for rotating said second rotary support and for driving said transmission means, said transmission means comprising a pair of cams and a cam follower associated with each cam, one of said cams and its associated cam follower adapted to move said carriage toward said first mentioned rotary support, and said other cam and its associated cam follower adapted to move said carriage away from said first mentioned rotary support.

7. A surface shaving machine for relatively feeding a rotating cutter and work piece in plunge cutting relation which comprises a rotary support, a motor for rotating said support, a carriage movable toward and from said support, a second rotary support on said carriage, transmission means for moving said carriage, a motor on said carriage, and connections intermediate said last motor and said second rotary support and said transmission means for rotating said second rotary support and for driving said transmission means, said transmission means comprising a pair of cams and a cam follower associated with each cam, one of said cams and its associated cam follower adapted to move said carriage toward said first mentioned rotary support, and said other cam and its associated cam follower adapted to move said carriage away from said first mentioned rotary support, said cams and cam followers arranged such that when one cam follower engages its cam, clearance is provided between said other cam and cam follower.

8. A surface shaving machine for relatively feeding a rotating cutter and work piece in plunge cutting relation which comprises a rotary support, a motor for rotating said support, a carriage movable toward and from said support, a second rotary support on said carriage, transmission means for moving said carriage, a motor on said carriage, and connections intermediate said last motor and said second rotary support and said transmission means for rotating said second rotary support and for driving said transmission means, said transmission means comprising a pair of cams and a cam follower associated with each cam, one of said cams and its associated cam follower adapted to move said carriage toward said first mentioned rotary support, and said other cam and its associated cam follower adapted to move said carriage away from said first mentioned rotary support, said cams and cam followers arranged such that when one cam follower engages its cam, clearance is provided between said other cam and cam follower, and resilient means urging said carriage away from said first mentioned rotary support.

9. A surface shaving machine comprising a rotary work support, a plurality of tool carriages movable in plunge cutting relation toward said work support, a rotary tool support on each carriage, a motor on each carriage for rotating the tool support carried thereby and for moving said carriage toward said work support in plunge cutting relation and return, and circuit control means for each carriage adapted to interrupt operation of the motor carried thereby upon completion of return movement of said carriage.

10. A surface shaving machine comprising a rotary work support, a work drive motor for rotating said support, a plurality of tool carriages movable in plunge cutting relation toward said work support, a rotary tool support on each carriage, a motor on each carriage for rotating the tool support carried thereby and for moving said carriage toward said work support in plunge cutting relation and return, and circuit control means for each carriage adapted to interrupt operation of the motor carried thereby upon completion of return movement of said carriage, said circuit control means arranged such that operation of said work drive motor is interrupted upon completion of return movement of all of said carriages.

11. A surface shaving machine comprising a rotary work spindle, a work drive motor for rotating said spindle, a plurality of tool spindles, independent drive means for each of said tool spindles for rotating and feeding said tool spindles in separately determinable cycles, and separate control means for each of said drive means to interrupt each of said drive means upon completion of its cycle.

12. A surface shaving machine comprising a rotary work spindle, a work drive motor for rotating said spindle, a plurality of tool spindles, independent drive means for each of said tool spindles for rotating and feeding said tool spindles in separately determinable cycles, and separate control means for each of said drive means to interrupt each of said drive means upon completion of its cycle, said control means also controlling said work drive motor and associated parts such that operation of said work drive motor is interrupted only upon interruption of all of said drive means.

13. In a surface shaving machine, a tool slide, a motor mounted on said slide, a base having ways in which said slide is movable, transmission means carried in part by said slide and in part by said base including a rotary cam carried by said slide, and geared to said motor, a driving sheave geared to said motor, and a rotary tool spindle mounted on said slide having a sheave for connection to said driving sheave.

14. In a surface finishing machine, means for rotating a work piece, a tool carriage movable toward and from said work piece, a feed post and a return post on said carriage, cam surfaces engaging said posts, motor means for rotating said surfaces, and means actuated by the return of said carriage to stop said motor means.

15. In a surface finishing machine, means for rotatably supporting a work piece, a tool carriage movable toward and from said work piece, means for supporting a rotary tool on said carriage, motor means for moving said carriage toward said work and return, for rotating said work piece, and for rotating said tool, a switch for initiating operation of said motor means, and a second switch operated by the return of said carriage for stopping all of said motor means.

16. In a surface finishing machine, means for rotatably supporting a work piece, a tool carriage movable toward and from said work piece, means for supporting a rotary tool on said carriage, a motor for moving said carriage toward said work and return, a motor for rotating said work, a motor for rotating said tool, a switch for initiating operation of all of said motors, and a second switch actuated by the return of said carriage for stopping said motors.

17. In an automatic surface finishing machine, means for mounting a work piece, a plurality of tool carriages mounted for movement toward and away from said work, cam followers rigidly carried by said carriages, cams engaging said followers, a motor on each carriage for rotating the tool carried thereby, and a motor for rotating all of said cams to cause said carriages to move toward the work and return.

18. In an automatic surface finishing machine, means for mounting a work piece, a plurality of tool carriages mounted for movement toward and away from said work, cam followers rigidly carried by said carriages, cams engaging said followers, a motor on each carriage for rotating the tool carried thereby, a motor for rotating all of said cams to cause said carriages to move toward the work and return, a switch for initiating operation of all of said motors, and a limit switch adjacent one of said carriages engaged by said carriage on its return to stop all of said motors.

19. A surface finishing machine comprising a frame, a rotary work spindle on said frame, a motor for rotating said work spindle, a tool carriage on said frame movable in a path oblique to the axis of said work spindle toward and from said work spindle, a rotary tool spindle on said carriage, feed means for said carriage comprising a rotatable cam and a cam follower carried by said carriage and frame, a feed motor, and transmission means between said feed motor and said cam.

20. A surface finishing machine comprising a frame, a rotary work spindle on said frame, a motor for rotating said work spindle, a tool carriage on said frame movable in a path oblique to the axis of said work spindle toward and from said work spindle, a rotary tool spindle on said carriage, feed means for said carriage comprising a rotatable cam and a cam follower carried by said carriage and frame, a feed motor, transmission means between said feed motor and said cam, and control means for said motors effective upon return of the carriage to initial position to terminate operation thereof.

21. In a machine of the character described, a work support, a tool carriage slidably mounted toward and away from said support, a rotary tool spindle on said carriage, feed means for said carriage including a rotary cam carried by said carriage, a motor on said carriage, and transmission means connecting said motor to said cam and to said tool spindle.

22. In a machine of the character described, a work support, a tool carriage slidably mounted toward and away from said support, a rotary tool spindle on said carriage, feed means for said carriage including a rotary cam carried by said carriage, a motor on said carriage, transmission means connecting said motor to said cam and to said tool spindle, and control means for said motor effective to stop said motor upon return of said carriage to initial position.

ROBERT S. DRUMMOND.